(12) United States Patent
Tanaka

(10) Patent No.: US 7,876,811 B2
(45) Date of Patent: Jan. 25, 2011

(54) METHOD AND APPARATUS FOR DETECTING SPREADING-CODE SYNCHRONIZATION FOR SPECTRUM SPREADING SIGNALS

(75) Inventor: Katsuyuki Tanaka, Kanagawa (JP)

(73) Assignee: Sony Corporation (JP)

( * ) Notice: Subject to any disclaimer, the term of this patent is extended or adjusted under 35 U.S.C. 154(b) by 832 days.

(21) Appl. No.: 11/879,640

(22) Filed: Jul. 18, 2007

(65) Prior Publication Data

US 2007/0263705 A1   Nov. 15, 2007

Related U.S. Application Data

(63) Continuation of application No. 10/380,650, filed as application No. PCT/JP02/07323 on Jul. 18, 2002, now Pat. No. 7,280,586.

(30) Foreign Application Priority Data

Jul. 26, 2001   (JP)   ............................ P2001-225317

(51) Int. Cl.
    H04B 1/00   (2006.01)
(52) U.S. Cl. ..................................... 375/150
(58) Field of Classification Search ................ 375/130, 375/147, 150, 148, 144, 316, 354, 377, 142, 375/343; 370/335, 342, 441; 708/442, 424, 708/425, 426; 365/189.011
    See application file for complete search history.

(56) References Cited

U.S. PATENT DOCUMENTS

| 4,660,164 | A | 4/1987 | Leibowitz |
|---|---|---|---|
| 5,600,328 | A | 2/1997 | Tachita et al. |
| 6,208,291 | B1 | 3/2001 | Krasner |
| 6,297,770 | B1 | 10/2001 | Ueda et al. |
| 6,532,251 | B1 | 3/2003 | King et al. |
| 6,678,313 | B1 * | 1/2004 | Imaizumi et al. ............ 375/150 |
| 6,704,348 | B2 | 3/2004 | Abraham et al. |

FOREIGN PATENT DOCUMENTS

| JP | 10-246768 | 9/1998 |
|---|---|---|
| WO | WO-98/59257 | 12/1998 |
| WO | WO-00/10030 | 2/2000 |

* cited by examiner

*Primary Examiner*—David C Payne
*Assistant Examiner*—Vineeta S Panwalkar
(74) *Attorney, Agent, or Firm*—Lerner, David, Littenberg, Krumholz & Mentlik, LLP

(57) ABSTRACT

A spreading-code synchronization detection method for a spectrum spreading signal that increases the sensitivity of spreading-code synchronization detection and in which a spreading-code synchronization detection is applied to a spectrum spreading signal obtained by spectrum-spreading data, having a bit transition period equal to a multiple of one period of a spreading code, with the spreading code. A process for obtaining a linear-addition correlation-calculation result equal to a value obtained by linear additions of the results of correlation calculations between the spectrum spreading signal and the spreading code is performed every unit period, which is a multiple of one period of the spreading code and shorter than the bit transition-period. The absolute value of the linear-addition correlation-calculation result obtained every unit period is calculated. The absolute value of the linear-addition correlation-calculation result obtained every unit period is added for a plurality of unit periods. A correlation point is detected from a value obtained by adding the absolute values.

8 Claims, 20 Drawing Sheets

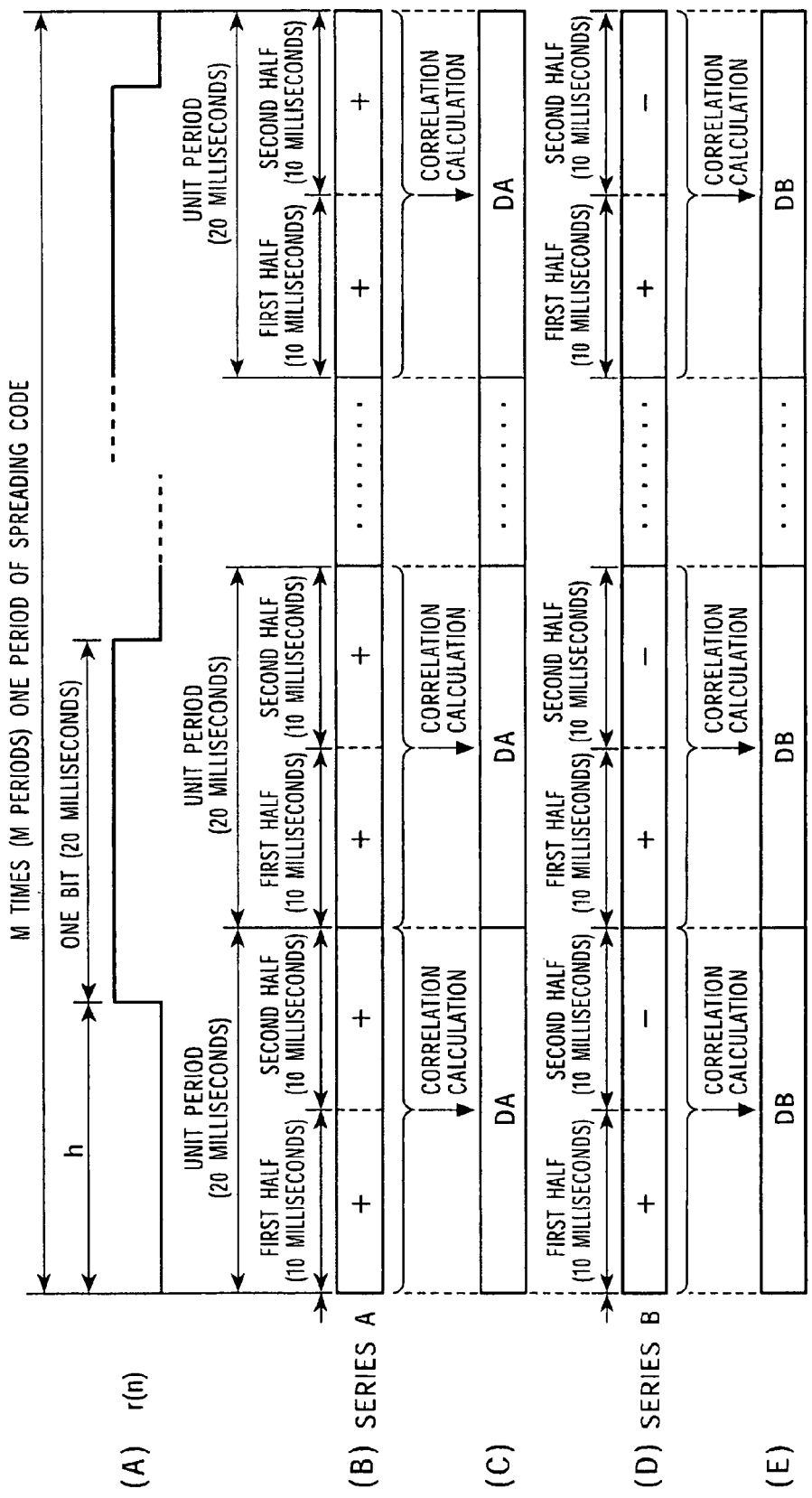

EXPLANATION OF FREQUENCY SEARCH

[EXPRESSION (1)]

$$F[r(n)*c(n)] \Longleftrightarrow F(k) = R(k)C(k)$$

[EXPRESSION (2)]

$$F(k) = R(k)\overline{C}(k) \quad \text{(WHERE, } ^- \text{ INDICATES COMPLEX CONJUGATE)}$$

METHOD AND APPARATUS FOR DETECTING SPREADING-CODE SYNCHRONIZATION FOR SPECTRUM SPREADING SIGNALS

CROSS-REFERENCE TO RELATED APPLICATIONS

This application is a continuation of U.S. application Ser. No. 10/380,650, filed on Mar. 14, 2003, the disclosure of which is incorporated herein by reference.

TECHNICAL FIELD

The present invention relates to methods and apparatuses for detecting spreading-code synchronization for spectrum spreading signals, such as GPS (global positioning system) satellite signals.

BACKGROUND ART

In a GPS system for measuring the position of a mobile body by using artificial satellites (GPS satellites), a GPS receiver has a basic function of receiving signals from four or more GPS satellites, calculating the position of the receiver from the received signals, and informing the user of the position.

The GPS receiver demodulates the signals sent from the GPS satellites to acquire the orbit data of the GPS satellites, and uses simultaneous equations to calculate the three-dimensional position of the receiver from the orbits and time information of the GPS satellites, and the delay time of the received signals. The reason why four GPS satellites from which signals are received are required is to remove the effect of an error between the time used in the GPS receiver and the time used by the satellites.

A commercially available GPS receiver receives a spectrum spreading signal radio wave called a C/A (clear and aquisition) code in an L1 band from a GPS satellite (Navstar) to perform calculations for position measurement.

The C/A code is a PN (pseudorandom noise) series code having a transmission-signal speed (chip rate) of 1.023 MHz and a code length of 1023, such as a Gold code, and is a signal obtained by BPSK (binary phase shift keying) modulating a carrier wave (hereinafter called a carrier) having a frequency of 1575.42 MHz by a signal obtained by spreading data of 50 bps. In this case, since the code length is 1023, a PN-series code is repeated in the C/A code with 1023 chips being used as one period (therefore, one period is equal to 1 millisecond), as shown in FIG. 20(A).

The PN-series code in the C/A code differs in each GPS satellite. The GPS receiver can detect in advance a PN-series code used by each GPS satellite. In addition, the GPS receiver understands from a navigation message like that described later whether the receiver can receive a signal from each GPS satellite at its position at the point of time. Therefore, for three-dimensional position measurement, for example, the GPS receiver receives radio waves which can be obtained at its position at the point of time from four or more GPS satellites, applies inverse spectrum spreading to the radio waves, and performs calculations for position measurement to obtain its position.

As shown in FIG. 20(B), one bit of satellite-signal data is transferred in units of 20 periods of the PN-series code, that is, in units of 20 milliseconds. In other words, the data transmission rate is 50 bps. The PN-series code in one period, that is, 1023 chips, is inverted between when the corresponding bit is "1" and when the bit is "0."

As shown in FIG. 20(C), one word is formed of 30 bits (600 milliseconds) in the GPS, and one sub-frame (six seconds) is formed of 10 words as shown in FIG. 20(D). In the first word of a sub-frame always includes a preamble having a fixed bit pattern even when data is updated, and data is transferred after the preamble.

Further, one frame (30 seconds) is formed of five sub-frames. The navigation message is transferred in units of one-frame data. First three sub-frames in one-frame data includes information unique to a satellite, called ephemeris information. The information includes a parameter used for obtaining the orbit of the satellite, and the time when the satellite sent the signal.

All GPS satellites have an atomic clock, and use common time information. The time when a GPS satellite sends a signal is indicated in units of seconds of the atomic clock. The PN-series code of a GPS satellite is generated in synchronization with the atomic clock.

Orbit information in the ephemeris information is updated in units of several hours. Until an update is performed, the same information is used. The orbit information in the ephemeris information can be stored in a memory of the GPS receiver so as to use the same information precisely for the several hours. The time when a GPS satellite sends a signal is updated in units of seconds.

The navigation message included in the remaining two sub-frames in the one-frame data is information sent in common from all satellites, called almanac information. The almanac information is transferred in 25 frames, and includes rough-position information of each GPS satellite and information indicating which GPS satellite is available. The almanac information is updated in units of several months. Until an update is performed, the same information is used. The almanac information can be stored in a memory of the GPS receiver so as to use the same information precisely for the several months.

To receive a signal from a desired GPS satellite to obtain the above-described data, the carrier is first removed, the signal sent from the GPS satellite is phase-synchronized with the C/A code by using the same PN-series spreading code as the C/A code used by the GPS satellite, prepared in the GPS receiver to capture the signal, and inverse spectrum spreading is performed. When phase synchronization with the C/A code is obtained and inverse spreading is performed, each bit is detected, and a navigation message, including time information, can be obtained from the signal sent from the GPS satellite.

The signal sent from the GPS satellite is captured by C/A-code phase synchronization search. In the phase synchronization search, correlation between the spreading code of the GPS receiver and the spreading code of the signal received from the GPS satellite is detected, and when a correlation value obtained as the result of correlation detection is larger than a value specified in advance, for example, it is determined that both codes are synchronized. When it is determined that they are not synchronized, the phase of the spreading code of the GPS receiver is controlled by some synchronization method to synchronize the spreading code of the GPS receiver with the spreading code of the received signal.

Since a GPS satellite signal is obtained by BPSK modulating the carrier by a signal obtained by spreading data with a spreading code, as described above, the carrier and the data need to be synchronized in addition to the spreading code when the GPS receiver receives the GPS satellite signal. The synchronization of the spreading code and that of the carrier cannot be performed independently.

The GPS receiver usually converts the carrier frequency of the received signal to an intermediate frequency several megahertz from the carrier frequency, and performs the above-described synchronization detection process with a signal having the intermediate frequency. The carrier in the intermediate-frequency signal mainly includes a frequency error caused by a Doppler shift corresponding to the moving speed of the GPS satellite and an error in the frequency of a local oscillator, generated inside the GPS receiver.

Therefore, the carrier frequency in the intermediate-frequency signal is unknown due to these frequency-error factors, and the carrier frequency needs to be searched for. A synchronization point (synchronized phase) in one period of the spreading code depends on the positional relationship between the GPS receiver and the GPS satellite. Since this positional relationship is also unknown, some synchronization method is required, as described above.

Conventional GPS receivers use frequency search for the carrier and a spreading-code synchronization detection method which uses a sliding correlator, a DLL (delay locked loop, and a costas loop. A description thereof will be given below.

Usually a reference-frequency oscillator provided for the GPS receivers is scaled down to generate a clock signal used for driving a PN-code generator in the GPS receivers. As the reference-frequency oscillator, a high-precision crystal oscillator is used, and a local oscillating signal used for converting a signal received from a GPS satellite to an intermediate-frequency signal is generated from the output of the reference-frequency oscillator.

FIG. 21 is a view used for describing the frequency search. Specifically, when the frequency of the clock signal used for driving the spreading-code generator in the GPS receiver is a frequency f1, phase synchronization search is performed for the spreading code, in other words, the phase of the spreading code is sequentially shifted by one chip, correlation between a GPS received signal and the spreading code is detected at each chip phase, and a correlation peak is detected to detect a phase at which synchronization is acquired.

When the clock signal has the frequency f1, if there is no phase at which synchronization is acquired, among 1023 chip phases through search, a scaling ratio for the reference-frequency oscillator is changed, for example, to change the frequency of the driving clock signal to a frequency f2, and phase search is performed in the same way for 1023 chips. As shown in FIG. 21, the frequency of the driving clock signal is changed step by step and phase search is repeated. The above-described operation is called frequency search.

When the frequency of the driving clock signal, for which synchronization can be acquired is detected through the frequency search, a final spreading-code phase synchronization detection is performed at the clock frequency. With this, even if the oscillation frequency of the crystal frequency oscillator is shifted, a satellite signal can be captured.

When the above-described conventional method is used as a spreading-code synchronization detection method, however, it is, in principle, not suited to high-speed synchronization, and to compensate this, a receiver needs to have multiple channels and to search for a synchronization point in parallel. When the synchronization of the spreading code and that of the carrier require time as described above, the GPS receiver has a slow response and causes inconvenience in use.

Due to the improvement of the capability of hardware, typical of which is DSPs (digital signal processors), without using a sliding correlation method like that described above, a method for performing spreading-code phase synchronization detection at a high speed is implemented by using a digital matched filter.

There have been known digital matched filters using a transversal filter or fast Fourier transform (hereinafter called FFT). Usually, a digital matched filter performs processing in units of periods of the spreading code.

When spreading-code synchronization detection is performed only with the results of correlation calculations for one period of the spreading code, a detection sensitivity is low. Therefore, to increase the detection sensitivity, a method has been conventionally used, in which the sum of the square of the result of correlation calculations for one period of the spreading code is accumulated. According to this method, since a correlation value at a correlation point is made larger than correlation values at non-correlation points irrespective of the positive and negative polarities of correlation values, the detection sensitivity is increased.

Since a noise component is also accumulated without being offset in the method in which the sum of the squares is accumulated, however, a loss caused by square operations is large and the degree of improvement of the detection sensitivity is low in a receiving condition having a low C/N (carrier-to-noise ratio).

There can be another method in which, not the sum of the squares, but the linear sum of the result of correlation calculations for one period of the spreading code is accumulated. In the linear sum, noise distributed at random is offset and reduced.

In a GPS signal, a spectrum spreading signal includes 50-bps navigation data, and a bit transition period is set to 20 times (20 milliseconds) the period (one millisecond) of the spreading code, as shown in FIG. 20. Therefore, when the linear sum of the result of correlation calculations for one period of the spreading code is accumulated for 20 or more milliseconds, since a correlation value has a inverted polarity from when a bit transition occurs, and offset, the accumulated value becomes small. The linear sum cannot be accumulated simply.

The present invention has been made in consideration of the foregoing points. An object of the present invention is to allow the sensitivity of spreading-code synchronization detection for a spectrum spreading signal of data having a bit transition period which is a multiple of one period of the spreading code, such as the above-described GPS signal, to be greatly improved.

DISCLOSURE OF INVENTION

To solve the foregoing issues, a spreading-code synchronization detection method for a spectrum spreading signal according to the present invention (1) is a method for spreading-code synchronization detection for a spectrum spreading signal obtained by spectrum-spreading data having a bit transition period which is a multiple of one period of a spreading code with the spreading code, characterized by comprising:

unit-period correlation-calculation linear-addition means for performing a process for obtaining a liner-addition correlation-calculation result equal to a value obtained by linear additions of the results of correlation calculations between the spectrum spreading signal and the spreading code, every unit period which is a multiple of one period of the spreading code and shorter than the bit transition period;

an absolute-value calculation step of calculating the absolute value of the liner-addition correlation-calculation result obtained every unit period in the unit-period correlation-calculation linear-addition step;

an absolute-value addition step of adding the absolute value of the liner-addition correlation-calculation result obtained every unit period, obtained in the absolute-value calculation step, for a plurality of unit periods; and a correlation-point detection step of detecting a correlation point from a value obtained by adding the absolute values in the absolute-value addition step.

In the present invention (1) having the above-described structure, not the square sum but the linear sum is obtained in a unit period shorter than the bit transition period of the data. The sum of the absolute value of the linear sum in the unit period is accumulated for a plurality of unit periods, and a correlation point is detected from the accumulated sum of the absolute values.

In this case, since where a bit transition occurs in the data is unknown, positive and negative correlation values are offset by each other in a process for calculating the linear sum in the unit period, and especially when a bit transition occurs at the center of a unit period, since the positive and negative correlation values are offset, the linear sum of the calculated correlation values becomes zero.

In the present invention (1), however, since the unit period is set shorter than the bit transition period, when a bit transition occurs at the center of a unit period, a bit transition never occurs at the center of a unit period immediately before or after the unit period.

Like the present invention (2), for example, when the unit period is half the bit transition period, if a bit transition occurs at the center of a unit period, the unit periods immediately before and after the unit period do not include a bit transition. Therefore, in the unit periods immediately before and after, the linear sum of the results of correlation calculations, which do not receive any effect of offsets caused by bit transitions is obtained. When a correlation point is detected by the sum of the absolute values thereof, it is expected that the detection sensitivity is increased.

A spreading-code synchronization detection method for a spectrum spreading signal according to the present invention (3) is a spreading-code synchronization detection method for a spectrum spreading signal obtained by spectrum-spreading data having a bit transition period which is a multiple of one period of a spreading code with the spreading code, characterized by comprising:

a unit-period correlation-calculation linear-addition step of obtaining a first liner-addition correlation-calculation result equal to a value obtained by linear additions of the results of correlation calculations between the spectrum spreading signal and the spreading code, every unit period which is a multiple of one period of the spreading code and equal to or shorter than the bit transition period, and of dividing the unit period into two periods, a first-half period and a second-half period, and of obtaining every unit period a second liner-addition correlation-calculation result equal to the sum of a first linear sum equal to the linear sum of the results of correlation calculations between the spectrum spreading signal and the spreading code in one of the first-half period and the second-half period and a second linear sum equal to the linear sum of the results of correlation calculations between the spectrum spreading signal and the spreading code in a state in which one of the spectrum spreading signal and the spreading code is inverted in sign, in the other one of the first-half period and the second-half period;

an absolute-value addition step of adding the sum of the absolute value of the first liner-addition correlation-calculation result and the absolute value of the second liner-addition correlation-calculation result for a plurality of unit periods; and a correlation-point detection step of detecting a correlation point from a value obtained by adding the absolute values in the absolute-value addition step.

In the present invention (3) having the above-described structure, the sum of the absolute value of the first liner-addition correlation-calculation result and the absolute value of the second liner-addition correlation-calculation result is always constant irrespective of the phase relationship between the unit period and the bit transition position. Therefore, when the sum of the absolute values is accumulated for a plurality of unit periods in the absolute-value addition step, the accumulated value is the same number of times the sum of the absolute values as the number of the plurality of unit periods.

Therefore, it becomes easier to set a threshold used for detecting a correlation point in the correlation-point detection step, and the detection sensitivity is also improved.

The present invention (4) is characterized in a spreading-code synchronization detection method for a spectrum spreading signal described in the present invention (3), in that the unit period is set equal to the bit transition period, and a phase shift between the unit period and the bit transition position is estimated by the ratio between the first linear-addition correlation-calculation result and the second linear-addition correlation-calculation result, and the phase shift between the unit period and the bit transition position is compensated for by the estimated phase shift.

In the present invention (4), the unit period is set equal to the bit transition period, and a phase shift between the unit period and the bit transition position is estimated by the ratio between the first linear-addition correlation-calculation result and the second linear-addition correlation-calculation result. The phase shift between the unit period of the spectrum spreading signal and the bit transition position of the data is compensated for by the estimated phase shift. With this, since a bit transition does not occur during a unit period, the linear addition of correlation values in a unit period always indicates the maximum value, and the detection sensitivity of spreading-code synchronization is further improved.

BRIEF DESCRIPTION OF THE DRAWINGS

FIG. 9 is a view used for describing the operation of a main section in the fourth embodiment.

BEST MODE FOR CARRYING OUT THE INVENTION

Figure 1:
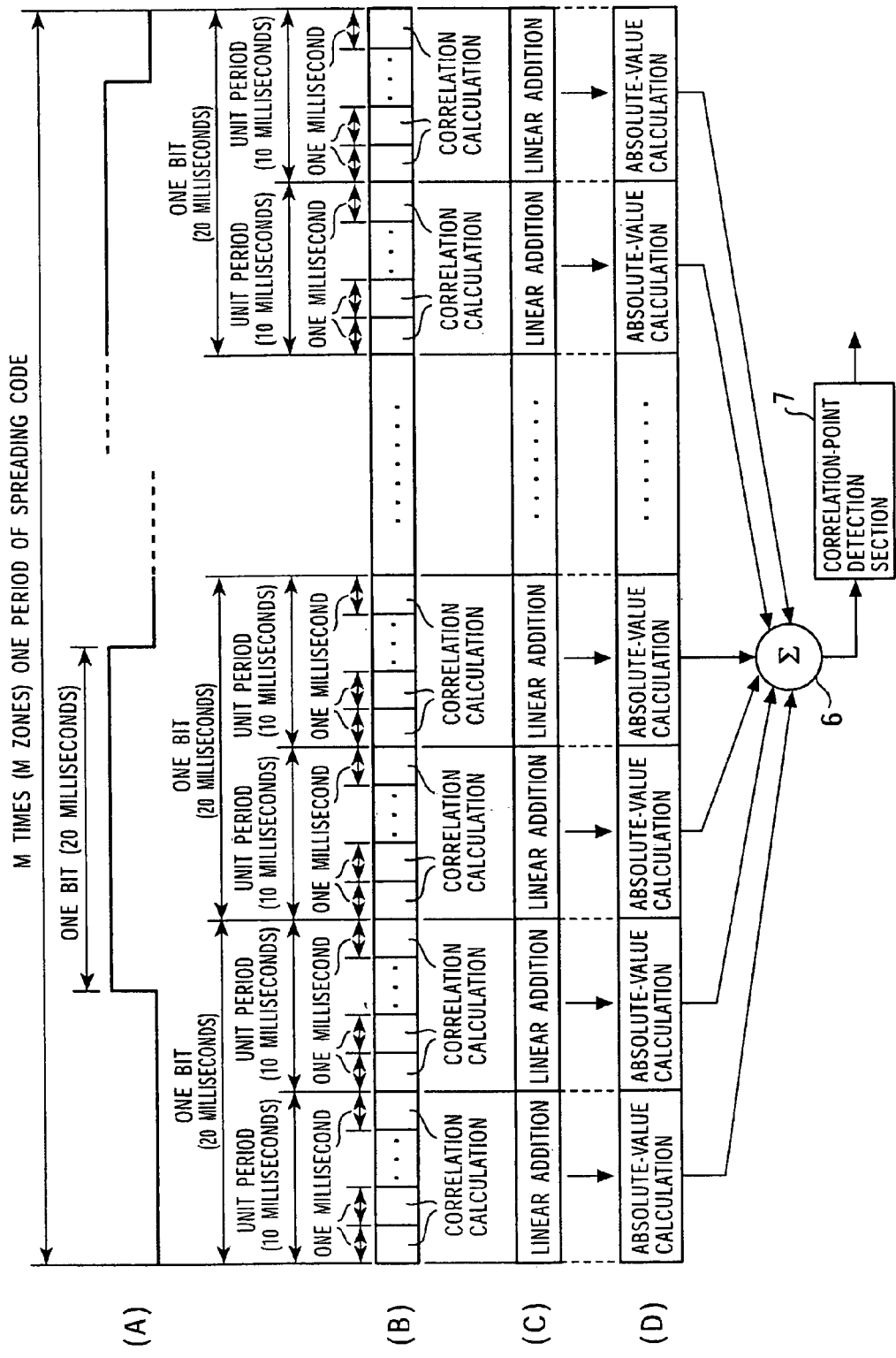
FIG. 1 is a view used for describing a main operation in a spreading-code synchronization detection method for a spectrum spreading signal according to a first embodiment of the present invention.

A case in which a method for detecting spreading-code synchronization for spectrum spreading signals according to an embodiment of the present invention is applied to spreading-code synchronization detection of a GPS signal in the above-described GPS receiver will be described below by referring to the drawings.

First Embodiment

Figure 2:
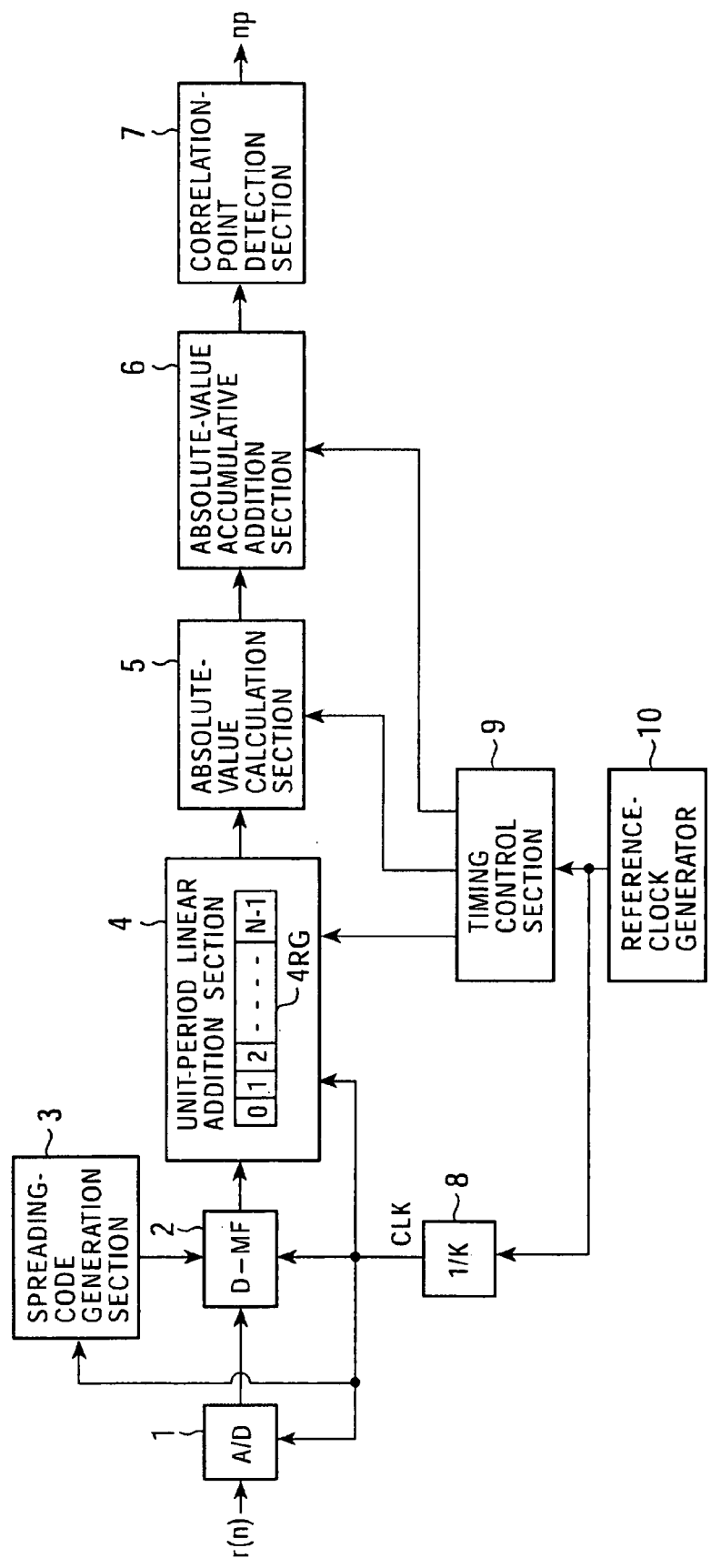
FIG. 2 is a block diagram of a spreading-code synchronization detection apparatus for a spectrum spreading signal according to the first embodiment of the present invention.

FIG. 2 is a block diagram showing an example structure of a spreading-code synchronization detection section in the GPS receiver, the section serving as a spreading-code synchronization detection apparatus for spectrum spreading signals according to a first embodiment. In FIG. 2, a received signal r(n) is an intermediate-frequency signal in which the carrier of a signal (spectrum-spreading signal) sent from a GPS satellite and received by a GPS antenna, not shown, has been low-frequency-converted to an intermediate frequency of 1.023 MHz.

To make the description simple, it is assumed that carrier synchronization is obtained for the received signal r(n) in the embodiment shown in FIG. 2. It is actually necessary to search for the carrier frequency by a method, such as that described later, and to obtain carrier synchronization.

The received signal r(n) is converted by an A/D converter 1 to a digital signal and then sent to a digital matched filter 2. A spreading code of one period is sent from a spreading-code generation section 3 to the digital matched filter 2. At this moment, the spreading-code generation section 3 outputs the spreading code used in a GPS satellite signal to be received. As a result, a result of correlation between the received signal and the spreading code is obtained from the digital matched filter 2.

Figure 3:
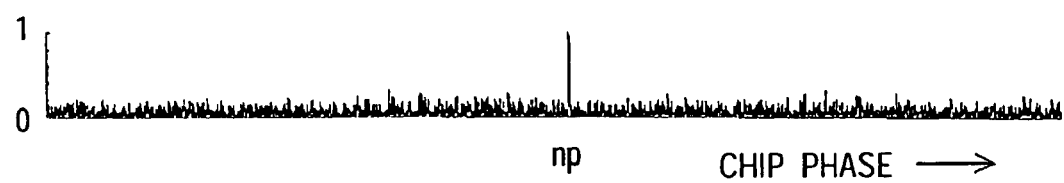
FIG. 3 is a view showing an example spectrum of a correlation detection output.

This result of correlation indicates a correlation value at each chip phase in one period of the spreading code. When a spreading code in the received signal r(n) is synchronized with the spreading code sent from the spreading-code generation section 3, a correlation waveform is obtained as shown in FIG. 3, in which a correlation value at one chip phase np among 1023 chips shows a peak which exceeds a threshold determined in advance. The chip phase having the peak is the phase of a correlation point. The output of the digital matched filter 2 is like the result of correlation shown in FIG. 3, repeated every period of the spreading code.

As described before, when a correlation point is detected from one period of the spreading code, the detection sensitivity is low. Therefore, in the present embodiment, the following measure is taken.

The result of correlation repeated every period of the spreading code, output from the digital matched filter 2, is sent to a unit-period linear addition section 4. The unit-period linear addition section 4 performs linear addition such that a value at each chip phase is synchronously added in the result of correlation repeated every period of the spreading code, output from the digital matched filter 2, within a unit period selected as a period which is a multiple of one period of the spreading code and which is shorter than the bit transition period of navigation data, 20 milliseconds. The unit-period linear addition section 4 performs this linear addition process in each unit period.

In the present embodiment, the unit period is set to 10 milliseconds, which is 10 times one period of the spreading code and which is half the bit transition period (20 milliseconds).

As shown in FIG. 2, the unit-period linear addition section 4 has the same number of stages of a register 4RG as the number N of chips in the spreading code, and accumulates in the register 4RG the result of correlation obtained at each chip phase of the spreading code, the result being linearly added for the unit period. Since the unit period is 10 milliseconds in this case, the stage of the register 4RG, corresponding to each chip phase linearly adds the 10 results of correlation obtained at each chip phase in the unit-period linear addition section 4.

The unit-period linear addition section 4 sends the result (corresponding to one period of the spreading code) of linear additions of correlation values within the unit period to an absolute-value calculation section 5. The result is converted to an absolute value every unit period, and then sent to an absolute-value accumulative addition section 6. The absolute-value accumulative addition section 6 accumulatively adds the absolute value of the result of linear additions of correlation values for each unit period, for a period M (M is an integer equal to two or more) times the unit period. Then, the absolute-value accumulative addition section 6 sends the result of accumulative additions to a correlation-point detection section 7.

The correlation-point detection section 7 compares the result of accumulative additions, which characteristic is shown in FIG. 3, with a threshold determined in advance.

When a peak exceeding the threshold is detected, it is assumed that the peak means that the received signal has been synchronized with the spreading code, and the phase of the peak is detected as a correlation point np.

A reference clock is sent from a reference-clock generator 10 to a scaler 8, a clock signal CLK having the same frequency as the sampling frequency of the received signal r(n) is generated, and the clock signal CLK is sent to the A/D converter 1, the digital matched filter 2, and the unit-period linear addition section 4.

The reference clock is also sent from the reference-clock generator 10 to a timing control section 9. The timing control section 9 generates a timing signal synchronized with the unit period, and sends it to the unit-period linear addition section 4, the absolute-value calculation section 5, and the absolute-value accumulative addition section 6.

[Specific Example of Digital Matched Filter]

Figure 4:
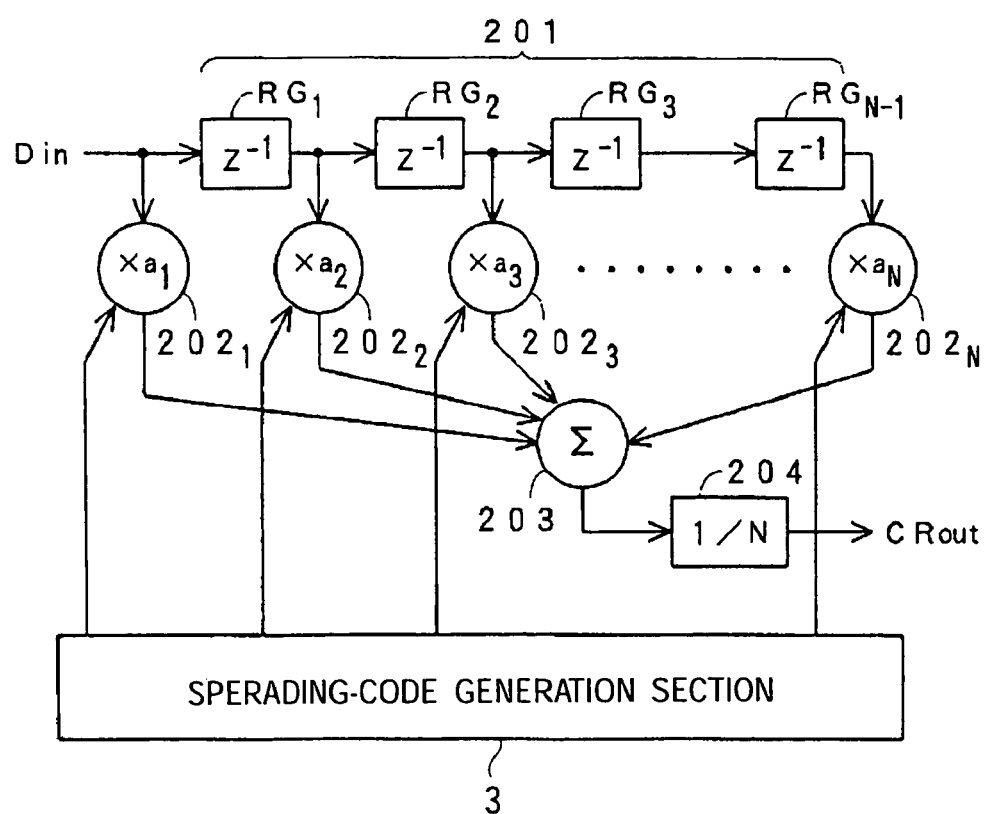
FIG. 4 is a block diagram showing an example structure of a digital matched filter used in an embodiment of the present invention.

The digital matched filter 2 shown in FIG. 2 can be formed of a transversal filter or by using FFT. FIG. 4 shows an example structure of the digital matched filter 2 which employs a transversal filter.

The digital matched filter 2 shown in FIG. 2 has the same number of stages of a shift register 201 as the number N of chips of the spreading code minus one. A digital signal Din sent from the A/D converter 1 is sequentially transferred into the shift register 201 by the clock signal CLK sent from the scaler 8, not shown in FIG. 4.

The digital signal Din and the output of each register RG constituting the shift register 201 are multiplied by coefficients in coefficient multipliers $202_1$, $202_2$, $202_3$, ..., and $202_N$, and then sent to a summing unit 203 for a summing calculation. The result of the summing calculation output from the summing unit 203 is attenuated by 1/N in a level adjustment section 204, and output as a result CRout of correlation.

The coefficient multipliers $202_1$, $202_2$, $202_3$, ..., and $202_N$ also receive the values (+1 or −1) of chips in the spreading code from the spreading-code generation section 3. In this case, the values of the chips in the spreading code are sent to the coefficient multipliers in a reverse order such that the first chip in the spreading code sent from the spreading-code generation section 3 corresponds to the coefficient multiplier $202_N$, and the 1023-th chip corresponds to the coefficient multiplier $202_1$.

Therefore, the result CRout of correlation output from the summing unit 203 shows a peak at a chip phase corresponding to when the shift register 201 receives a digital signal synchronized with the spreading code sent from the spreading-code generation section 3, and the result of correlation is in a low level at the other chip phases. In other words, the signal having the characteristic shown in FIG. 3 is obtained as the result CRout of correlation output from the summing unit 203.

Figure 5:
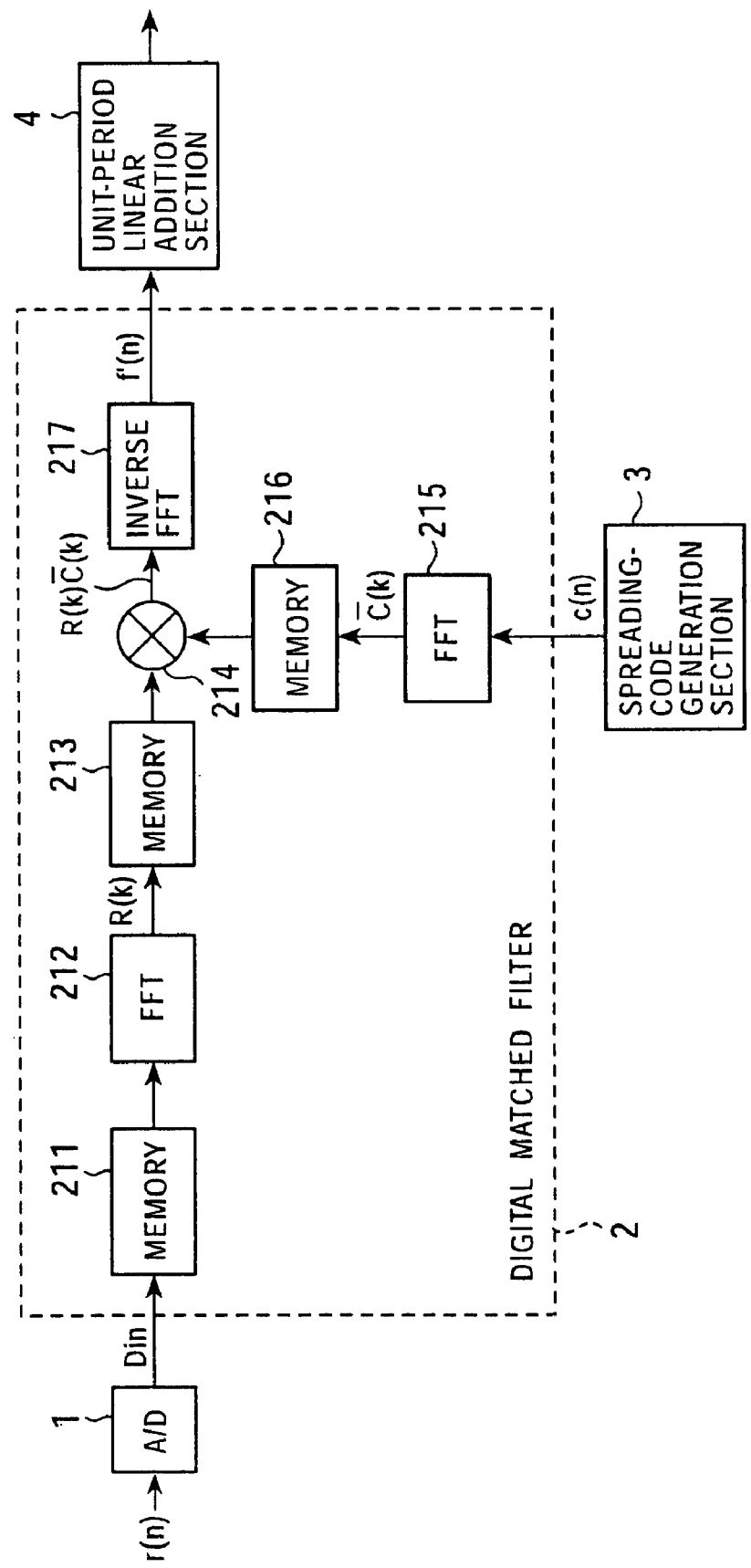
FIG. 5 is a block diagram showing another example structure of a digital matched filter used in an embodiment of the present invention.

Next, FIG. 5 shows an example structure of the digital matched filter 2 which employs FFT.

In the case shown in FIG. 5, a digital signal Din sent from the A/D converter 1 is written into a buffer memory 211. The signal written into the buffer memory 211 is read in units of periods (1023 chips) of the spreading code and FFT-processed by an FFT processing section 212. The result of the FFT processing is written into a memory 213. The result of the FFT processing read from the memory 213 is sent to a multiplier 214.

The spreading-code generation section 3 generates a spreading code of the same series as the spreading code used in a received signal sent from a satellite from which signals are to be received. The spreading code of one period (1023 chips) sent from the spreading-code generation section 3 is sent to an FFT processing section 215 and FFT-processed, then, the complex conjugate thereof is calculated, and the result of processing is sent to a memory 216 as the result of FFT processing of the spreading code.

In the same way as in usual cases, the result of FFT processing is sequentially read from a lower frequency from the memory 216 and sent to the multiplier 214.

The multiplier 214 multiplies the result of FFT processing of the received signal sent from the memory 213 by the result of FFT processing of the spreading code sent from the memory 216 to calculate the degree of correlation between the received signal and the spreading code in a frequency domain. The result of multiplication is sent to an inverse-FFT processing section 217, and the signal in the frequency domain is converted to a signal in a time domain.

The result of inverse-FFT processing obtained from the inverse-FFT processing section 217 is a correlation detection signal of the received signal and the spreading code in the time domain. This correlation detection signal is sent to the unit-period linear addition section 4.

In the same way as in the above-described case, in which the digital matched filter employs a transversal filter, this correlation detection signal indicates a correlation value at each chip phase in one period of the spreading code. When the spreading code in the received signal is synchronized with the spreading code sent from the spreading-code generation section 3, a correlation waveform is obtained as shown in FIG. 3, in which a correlation value at one chip phase among 1023 chips shows a peak which exceeds a threshold determined in advance. The chip phase having the peak is the phase of a correlation point.

Figures 21, 22:
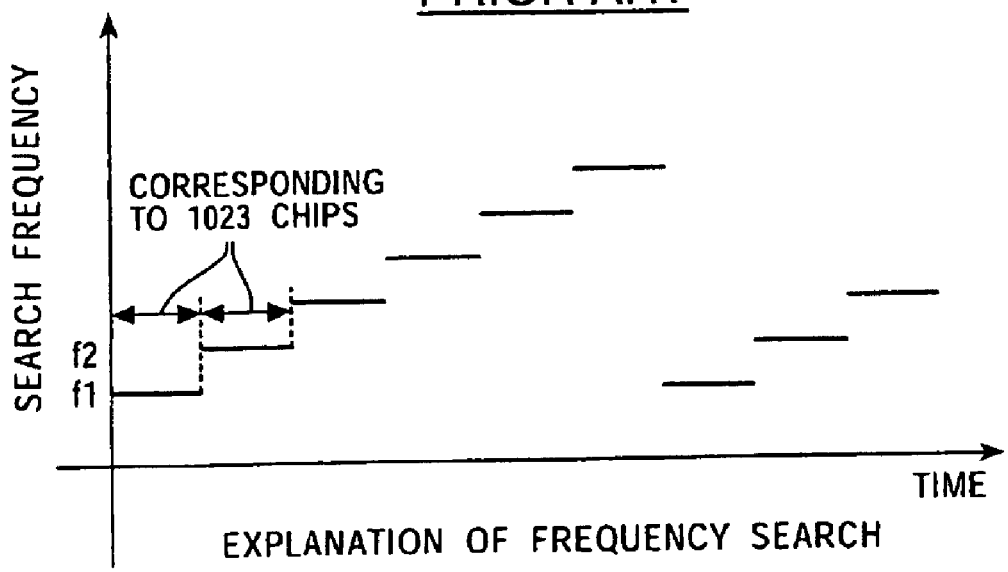
FIG. 21 is a view used for describing a conventional carrier and conventional spreading-code synchronization processing.
FIG. 22 is a view used for describing an embodiment of the present invention.

The principle of the processing performed by the digital matched filter in the case shown in FIG. 5 is based on a theorem in which convolutional Fourier transform in the time domain is a multiplication in the frequency domain, as shown in expression (1) of FIG. 22.

In expression (1), r(n) indicates a received signal in the time domain, and R(k) indicates the discrete Fourier transform thereof. In addition, c(n) indicates a spreading code sent from the spreading-code generation section, C(K) indicates the discrete Fourier transform thereof, "n" indicates a discrete time, "k" indicates a discrete frequency, and F[ ] indicates Fourier transform.

When a correlation function of the two signals r(n) and c(n) is defined as f(n), F(k) which shows the discrete Fourier transform of f(n) has a relationship shown in expression (2) of FIG. 22. Therefore, when it is assumed that r(n) is a signal sent from the A/D converter 1 shown in FIG. 1 and c(n) is a spreading code sent from the spreading-code generation section 3, the correlation function f(n) of r(n) and c(n) can be calculated in the following procedure by using expression (2) without using a usual definition expression.

Calculate R(k) which is the discrete Fourier transform of the received signal r(n).

Calculate the complex conjugate $\overline{C}(k)$ of C(k) which is the discrete Fourier transform of the spreading code c(n).

Calculate F(k) in expression (2) by using R(k) and the complex conjugate $\overline{C}(k)$ of C(k).

Calculate a correlation function f(n) by applying inverse discrete Fourier transform to F(k).

When the spreading code included in the received signal r(n) matches the spreading code c(n) sent from the spreading-code generation section 3, as described above, the correlation function f(n) calculated according to the above procedure has a time waveform that has a peak at a correlation point as shown in FIG. 3. As described above, in the present embodiment, since high-speed FFT and inverse FFT algorithms are used in the discrete Fourier transform and the inverse Fourier transform, calculations are performed substantially faster than when correlation is calculated according to the definition.

In the case shown in FIG. 5, the spreading-code generation section 3 and the FFT processing section 215 are separately provided. When FFT is applied in advance to the spreading code corresponding to each GPS satellite, and the obtained result is stored in a memory, an FFT calculation applied to the spreading code c(n) when a satellite signal is received can be omitted.

Description of Operations in First Embodiment

FIG. 1 is a timing chart used for describing operations in the first embodiment having the above-described structure.

As described above, when the carrier is removed, a GPS signal is obtained by applying spectrum spreading to 50-bps navigation data with a spreading code having a frequency of 1.023 MHz and a period of 1023. The time length of one bit in the navigation data is 20 milliseconds, and includes 20 periods of the spreading code which has a period of one millisecond.

Although a noise component is much larger in the GPS signal, when correlation with a spreading code generated inside the receiver is detected in many periods, the receiving sensitivity is improved. This is because the GPS signal is a periodic signal whereas heat noise, which is a main noise component, is a random, non-periodic signal.

The GPS signal is partially a periodic signal, but includes navigation data which has bit transitions as shown in FIG. 1(A). Since the navigation data is unknown, when correlation with the spreading code is obtained for many periods of the spreading code, positive and negative signals (bit "1" and bit "0") are offset by each other in the navigation data, as described above, and there is a case in which a correlation peak such as that shown in FIG. 3 is not detected.

To prevent this from occurring, as described above, there is a method in which the sum of the absolute values or the square values of correlation obtained every period (one millisecond) of the spreading code is added for many periods. According to this method, the correlation peak does not depend on the navigation data. However, a loss caused by squaring operations becomes larger as C/N (electric-power ratio of carrier to noise) becomes smaller, and the degree of improvement in the detection sensitivity is low.

Therefore, in the first embodiment, the detection sensitivity is improved in a way described below.

As shown in FIG. 1(B), in the first embodiment, ten periods (10 milliseconds) of the spreading code, which is half the period of one bit in the navigation data, is used as a unit period. In this unit period, that is, 10 periods of the spreading code, the digital matched filter 2 sequentially obtains the result of correlation calculations every period (one millisecond) of the spreading code, as described before.

Then, the unit-period linear addition section 4 linearly adds the result of correlation calculations obtained every period of the spreading code, within the unit period.

Next, the absolute-value calculation section 5 calculates the absolute value of the result of linear additions of correlation values, obtained every unit period and sent from the unit-period linear addition section 4, as shown in FIG. 1(D).

Then, the absolute-value accumulative addition section 6 adds the absolute values for M periods (hereinafter called M zones) of the spreading code. The total sum of the absolute values in the M periods is sent to the correlation-point detection section 7, and a correlation point is detected.

In this case, since bit transition positions in the navigation data shown in FIG. 1(A) are unknown, the unit period and the bit transition positions of the navigation data usually differ in phase in timing, as shown in the figure. Therefore, positive and negative components are offset by each other in the process of linear correlation calculations within unit periods which include a bit transition, such as second and fourth unit periods from the left in FIG. 1(B), and especially when a bit transition occurs at the center of a unit period, positive and negative components are offset by each other completely, and the result of correlation calculations becomes zero in the unit period.

In the present embodiment, however, since at least half a plurality of unit periods in the M zones does not include a bit transition, a difference in the detection sensitivity is just 3 dB between the best case in which the navigation data has the same sign over the M zones or bit transition positions match boundaries of unit periods, and the worst case in which the navigation data alternately has "0" and "1" in the M zones and bit transitions are located at the centers of unit periods.

As described above, the spreading-code synchronization detection method according to the present embodiment is simple, but, since a loss caused by squaring (absolute-value obtaining) operations is small, has a higher degree of improvement in the synchronization detection sensitivity than the method in which the sum of the absolute values of correlation obtained in units of the periods of the spreading code is obtained in a period M times the unit period.

In the above-described first embodiment, the unit period, in which the results of correlation obtained in units of periods of the spreading code are linearly added, is set to 10 periods of the spreading code, which is equal to half the period of one bit in the navigation data. The unit period does not necessarily need to be set to the 10 periods. When the unit period is set shorter than the 10 periods, the degree of improvement in the detection sensitivity is lowered but dispersion in correlation values, caused by bit transition positions is low. Conversely, when the unit period is set longer than the 10 periods, dispersion caused by bit transition positions is high but the degree of improvement in the detection sensitivity becomes high depending on the bit transition positions.

Second Embodiment

A second embodiment is a modification of the first embodiment, and differs from the first embodiment in the procedure to obtain the result of correlation-value linear additions.

More specifically, in the above-described first embodiment, the result of correlation calculations is obtained every period of the spreading code by the digital matched filter 2, and the result of correlation calculations is linearly added every unit period. When the received signal r(n) is linearly added in one period of the spreading code before the digital matched filter 2 performs correlation calculations, and the digital matched filter applies correlation calculations to the result of linear additions, the exactly same result and advantage as in the above-described case are obtained. This is a case described in the second embodiment.

Figure 6:
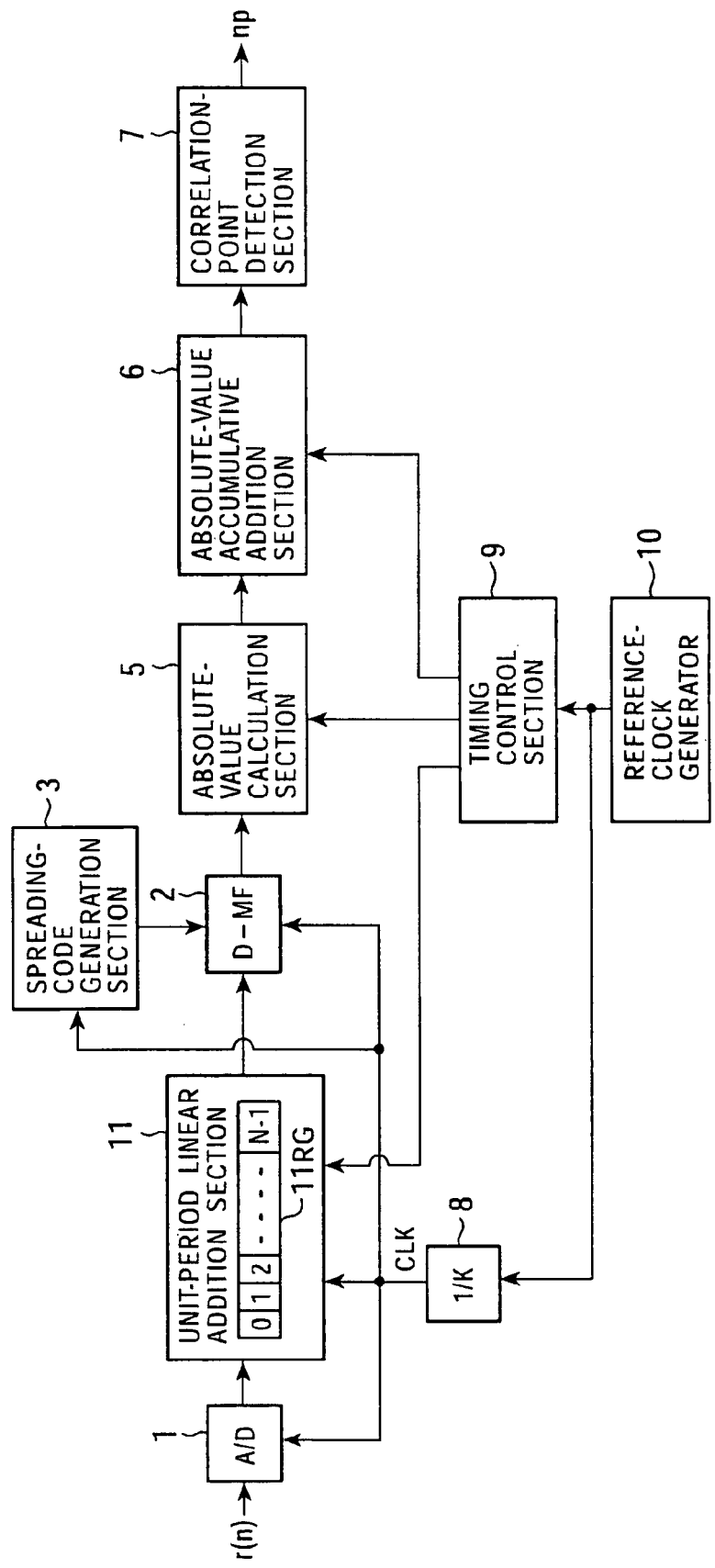
FIG. 6 is a block diagram of a spreading-code synchronization detection apparatus for a spectrum spreading signal according to a second embodiment of the present invention.

FIG. 6 is a block diagram showing an example structure of a spreading-code synchronization detection apparatus according to the second embodiment.

In the second embodiment, a digital signal output from an A/D converter 1 is sent to a unit-period linear addition section 11. The unit-period linear addition section 11 linearly adds a digital signal obtained in a unit period, actually in this case, a digital signal obtained in 10 periods (10 milliseconds) of the spreading code, in one period of the spreading code. In other words, 10 data items at the same chip phase of the spreading code are synchronously added in the digital signal in 10 periods of the spreading code, within each unit period.

Therefore, the unit-period linear addition section 11 outputs the same number of the results (the same number of data items as the number of chips in one period of the spreading code) of synchronous additions as the number of data items in one period of the spreading code. The results of synchronous additions are sent to the digital matched filter 2. Correlation calculations are applied to the results of synchronous additions and the spreading code sent from a spreading-code generation section 3. The result of correlation calculations is sent to an absolute-value calculation section 5. The other structure is the same as that of the first embodiment.

The second embodiment differs from the first embodiment in that linear additions are performed every period of the spreading code in a stage prior to the digital matched filter 2, but obtains exactly the same result and advantage as the first embodiment.

Also in the second embodiment, the unit period is set to 10 periods of the spreading code, which is half the one-bit period of navigation data. The unit period is not necessarily equal to the 10 periods, as in the above-described first embodiment.

Third Embodiment

A third embodiment is also a modification of the first embodiment, and differs from the first embodiment in the procedure to obtain the result of correlation-value linear additions.

In the third embodiment, in a case in which a digital matched filter using FFT, as shown in FIG. 5, is used as the digital matched filter 2, the unit-period linear addition section 4 disposed subsequent to the digital matched filter 2 in the first embodiment, or the unit-period linear addition section 11 disposed before the digital matched filter 2 in the second embodiment is omitted.

Figure 7:
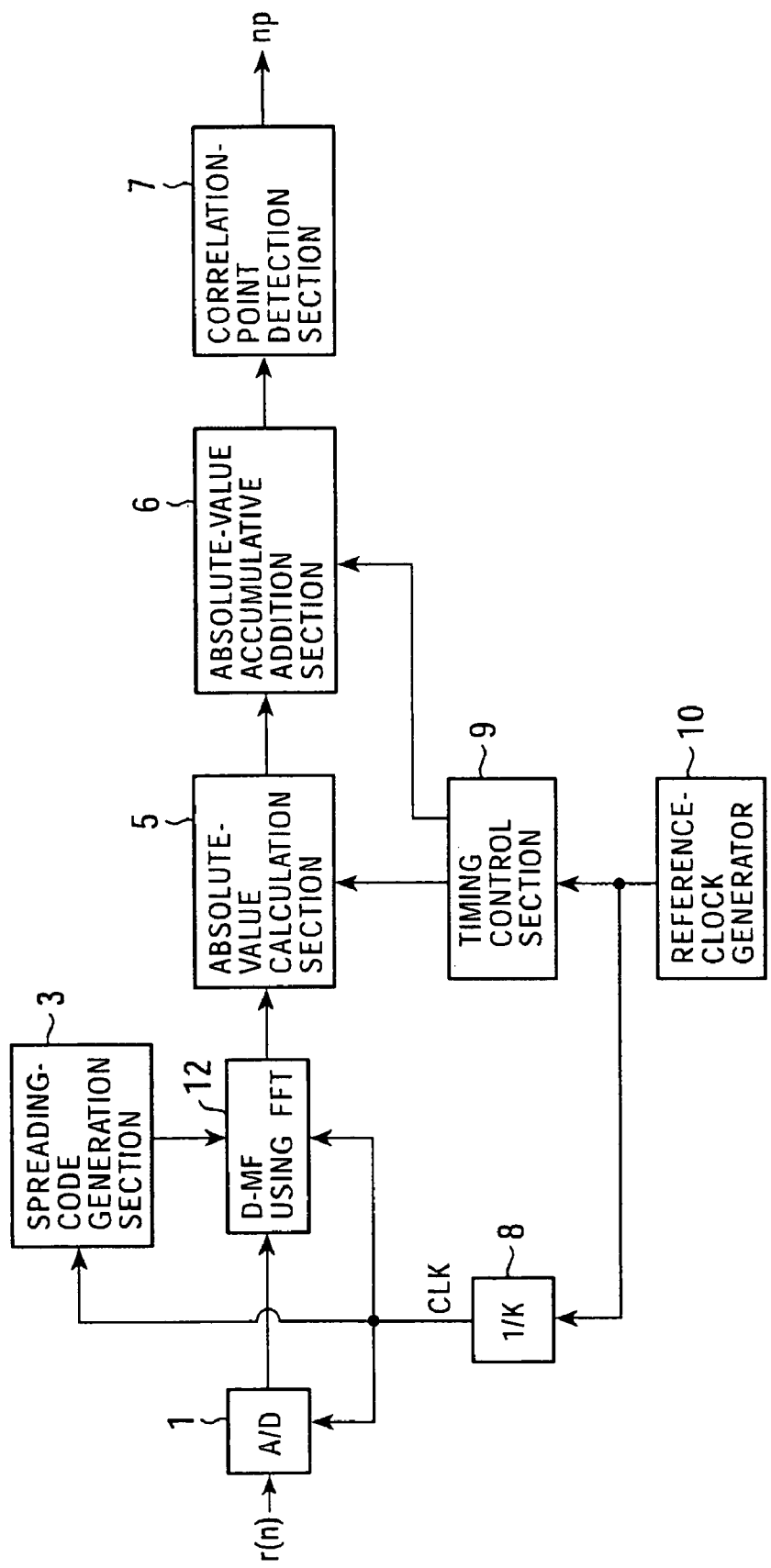
FIG. 7 is a block diagram of a spreading-code synchronization detection apparatus for a spectrum spreading signal according to a third embodiment of the present invention.

FIG. 7 is a block diagram showing an example structure of a spreading-code synchronization detection apparatus according to the third embodiment.

More specifically, in the third embodiment, a digital signal output from an A/D converter 1 is sent to a digital matched filter 12 using FFT, formed of a portion enclosed by a dotted line in FIG. 5.

In the above-described first embodiment, a digital signal is read every period of the spreading code from the memory 211 and sent to the FFT processing section 212, as described by referring to FIG. 5. In the third embodiment, digital data is read from a memory 211 every unit period, and sent to an FFT processing section 212, and FFT calculations are performed in the digital matched filter 12 using FFT.

In the third embodiment, the FFT processing section 212 applies FFT calculations to a digital signal obtained every unit period. Since the unit period includes 10 periods of the spreading code in the above-described case, the FFT processing section 212 outputs the result of FFT calculations, which is the same as the result obtained by accumulating the result of FFT calculations of the digital signal obtained every period of the spreading code, for 10 periods, and the output result of FFT calculations is written into a memory 213.

Subsequent processes in the digital matched filter 12 using FFT are exactly the same as those described by referring to FIG. 5. An inverse FFT processing section 217 outputs the result of correlation calculations, which is again expressed in the time domain. In the third embodiment, the result of correlation calculations is output from the digital matched filter 12 using FFT to an absolute-value calculation section 5.

As described above, according to the third embodiment, since FFT calculations are applied to a digital signal obtained in a unit period, the unit-period linear addition section 4 disposed subsequent to the digital matched filter 2 in FIG. 2, or the unit-period linear addition section 11 disposed before the digital matched filter 2 in FIG. 6 can be omitted, and the structure is simplified.

Even in the second embodiment, the unit period is set to 10 periods of the spreading code, which is half a one-bit period of the navigation data. Exactly in the same way as in the above-described first embodiment, the unit period does not necessarily include the 10 periods.

Fourth Embodiment

In the above-described first to third embodiments, the method is used, in which the results of correlation calculations obtained every period of the spreading code are linearly added, the absolute values of the results of linear additions are accumulatively added in the M zones, and a correlation point is detected from the result of accumulative additions. Therefore, the higher degree of improvement in the detection sensitivity of a correlation point is obtained than in the conventional method described at the top part of the specification.

In the method used in the above-described first to third embodiments, however, since the results of correlation calculations may have dispersion depending on the phase relationship between the unit period and bit transition positions, it is difficult to set a threshold with respect to a peak correlation value when a correlation point is detected. Therefore, it is difficult to use the method in terms of the determination of whether correlation exists. A fourth embodiment solves this problem.

Figure 8:
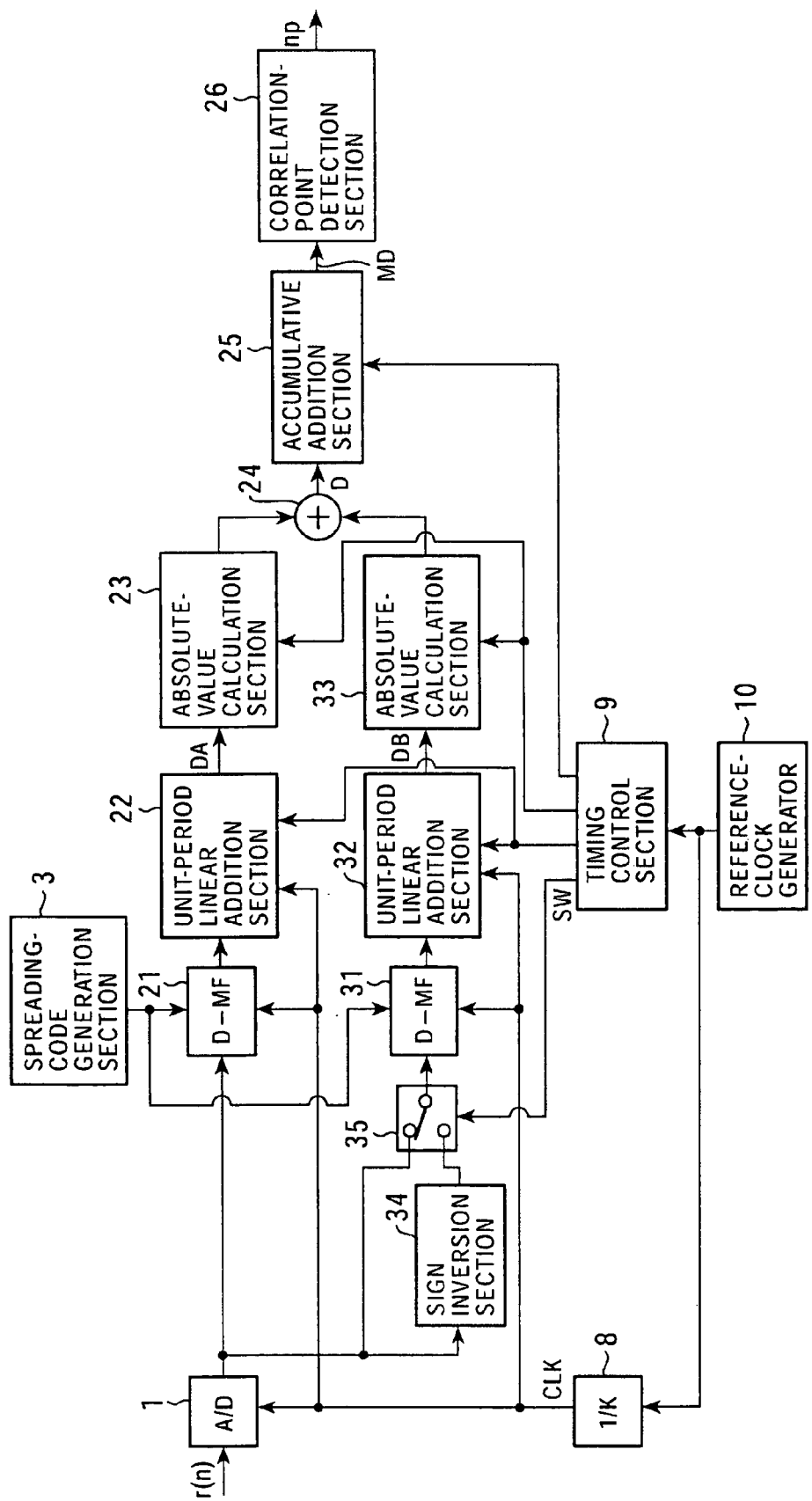
FIG. 8 is a block diagram of a spreading-code synchronization detection apparatus for a spectrum spreading signal according to a fourth embodiment of the present invention.

FIG. 8 is a block diagram of a spreading-code synchronization detection apparatus for a spectrum spreading signal according to the fourth embodiment. FIG. 9 is a timing chart used for describing the operation of the apparatus shown in FIG. 8.

In the fourth embodiment, two signal series are generated from a received signal r(n) (shown in FIG. 9(A)). A first signal series A (shown in FIG. 9(B)) is the same as the received signal r(n).

As for the first signal series A, a digital signal output from an A/D converter 1 is sent as is to a digital matched filter 21, and correlation calculations with a spreading code sent from a spreading-code generation section 3 are performed, as described in the above-described first embodiment. The result of correlation calculations for each period of the spreading code is sent to a unit-period linear addition section 22, and linearly added in a unit period.

In the fourth embodiment, the unit period is set to include one bit of the navigation data, that is, 20 periods of the spreading code.

A linear-addition correlation-calculation result DA (shown in FIG. 9(C)) output from the unit-period linear addition section 22 is sent to an absolute-value calculation section 23, and is converted to its absolute value, and is sent to an addition section 24. The addition output D of the addition section 24 is sent to an accumulative addition section 25, and accumulatively added over M zones in the same way as in the first embodiment. The result MD of accumulative additions is sent to a correlation-point detection section 26.

A clock signal CLK output from an scaler 8 and various timing signals output from a timing control section 9 are sent to circuit blocks in the same way as in the above-described first embodiment. As described above, the fourth embodiment differs from the first embodiment in that the unit period is 20 milliseconds.

The structure used for the first signal series A is the same as that used in the above-described first embodiment except the addition section 24. The difference is that the unit period includes the period of one bit of the navigation data, that is, 20 milliseconds in the fourth embodiment, whereas the unit period is half the period of one bit of the navigation data, that is, 10 milliseconds in the above-described first embodiment.

The result of linear additions for 10 milliseconds can be added twice to obtain the result of linear additions for 20 milliseconds for the first signal series A, in the same way as in the first embodiment.

Next, a process for a second signal series B will be described. As for the second signal series B, the digital signal output from the A/D converter 1 is sent to one input end of a switch circuit 35 as is, and also sent to a sign inversion section 34, its sign is inverted, and then sent to the other input end of the switch circuit 35.

The switch circuit 35 is alternately switched by a switch switching signal SW sent from the timing control section 9 between the one input end for the first half period (10 milliseconds) of a unit period and the other input end for the second half period (10 milliseconds) of the unit period. Therefore, the switch circuit 35 outputs the signal series B (shown in FIG. 9(D)) in which the digital signal converted from the received signal r(n) is inverted in sign at the second half period of a unit period.

The signal series B digital signal is sent to a digital matched filter 31, and correlation calculations with the spreading code sent from the spreading-code generation section 3 are performed, as described in the above-described first embodiment. The result of correlation calculations performed every period of the spreading code is sent to a unit-period linear addition section 32, and linearly added in a unit period.

A linear-addition correlation-calculation result DB (shown in FIG. 9(E)) output from the unit-period linear addition section 32 is sent to an absolute-value calculation section 33, is converted to its absolute value, and then sent to the addition section 24. The absolute value of the result DB is added to the absolute value of the linear-addition correlation-calculations result DA, output from the absolute-value calculation section 23. Therefore, the result D of additions output from the addition section 24 is:

$D=|DA|+|DB|$     [expression (3)]

The result D of additions is accumulated for the M zones (M.≧1) by an accumulative addition section 25, and the result MD of accumulation is sent to a correlation-point detection section 26. The correlation-point detection section 26 determines whether a peak larger than a threshold specified in advance has been detected to determine whether a correlation point has been detected. When a peak is detected, the chip phase where the peak is obtained is detected as a correlation point np.

Figure 10A:
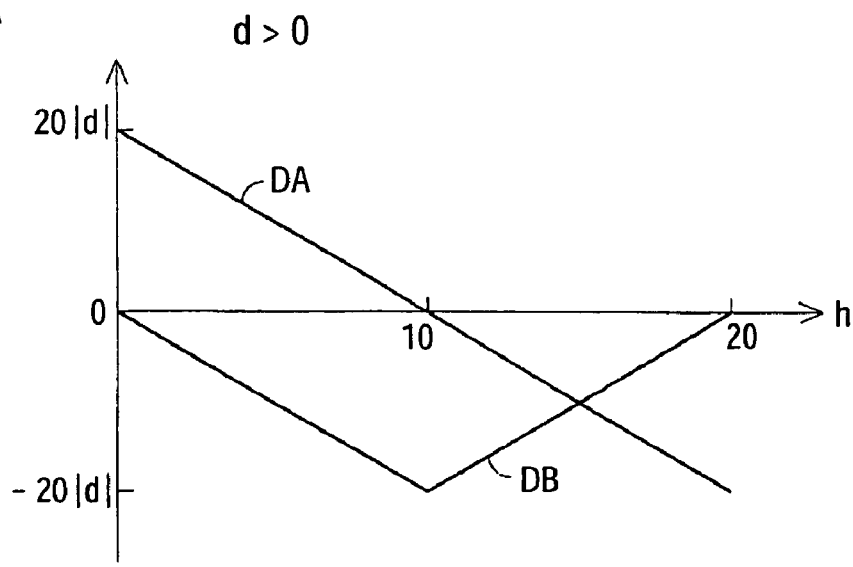
FIG. 10A and FIG. 10B are views used for describing the main section in the fourth embodiment.
Figure 10B:
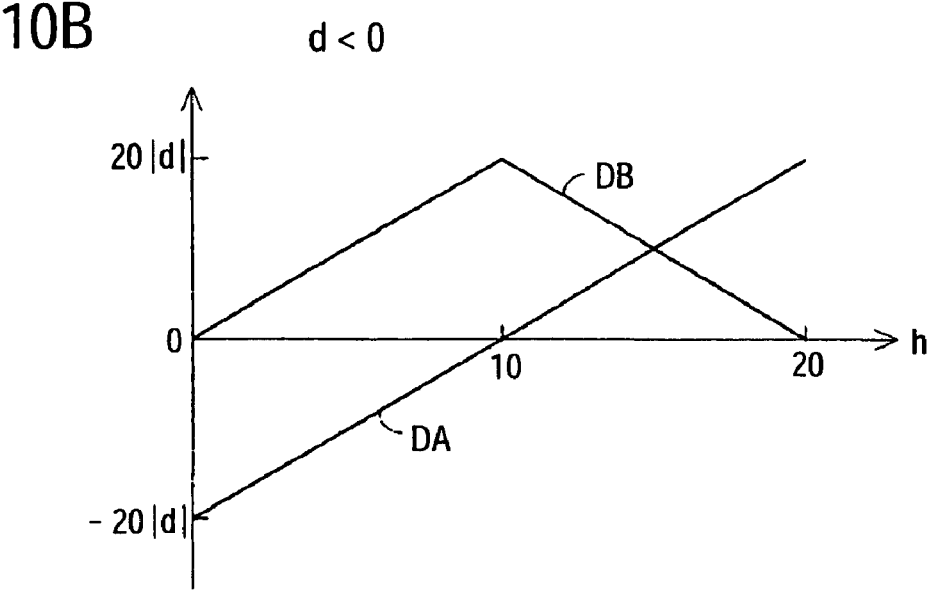

When the phase shift between a bit transition position and a unit period is called "h" as shown in FIG. 9(A) in the fourth embodiment, the linear-addition correlation-calculation results DA and DB output from the unit-period linear addition sections 22 and 32 with respect to the phase shift "h" are shown in FIG. 10A and FIG. 10B.

FIG. 10A and FIG. 10B are based on a case in which the navigation data is inverted every bit. In addition, FIG. 10A and FIG. 10B are characteristic views assuming that a correlation value obtained in one period of the spreading code is "d" and "M" is set to one. FIG. 10A shows a case in which the correlation value "d" is negative, and FIG. 10B shows a case in which the correlation value "d" is positive. The phase shift "h" is expressed in the number of periods of the spreading code (can be expressed in milliseconds because one period of the spreading code is one millisecond).

More specifically, as shown in FIG. 10A and FIG. 10B, when the top position of a unit period is synchronized with a bit transition position of the navigation data at a phase shift "h" of zero, since 20 correlation values "d" each obtained in one period of the spreading code, in a unit period are all positive or all negative in the first signal series A, the linear-addition correlation-calculation result DA is:

$DA=20|d|$ when d>0

$DA=-20|d|$ when d<0

In contrast, since the sign is inverted at the center of a unit period in the second signal series B when the phase shift "h" is zero, 20 correlation values "d" each obtained in one period of the spreading code, in a unit period are half positive and half negative and offset by each other. Therefore, the linear-addition correlation-calculation result DB becomes zero.

When a bit transition position is at the center of a unit period at a phase shift "h" of 10, since 20 correlation values "d" each obtained in one period of the spreading code, in a unit period are half positive and half negative by bit inversion in the first signal series A, and are offset by each other. Therefore, the linear-addition correlation-calculation result DA becomes zero.

In contrast, since the sign is inverted synchronously with a bit transition at the center of a unit period when the phase shift "h" is 10 in the second signal series B, 20 correlation values "d" each obtained in one period of the spreading code, in a unit period are all positive or all negative. The linear-addition correlation-calculation result DB is:

$DB=-20|d|$ when d>0

$DB=20|d|$ when d<0

When the unit period is shifted by one bit of the navigation data at a phase shift "h" of 20, since 20 correlation values "d" each obtained in one period of the spreading code, in a unit period are all positive or all negative in the first signal series A, although the polarity is inverted from when the phase shift "h" is zero, the linear-addition correlation-calculation result DA is:

$DA=-20|D|$ when d>0

$DA=20|D|$ when d<0

In contrast, since the sign is inverted at the center of a unit period in the second signal series B when the phase shift "h" is 20, 20 correlation values "d" each obtained in one period of the spreading code, in a unit period are half positive and half negative, although the polarity is inverted from when the phase shift "h" is zero, and the correlation values are offset by each other. Therefore, the linear-addition correlation-calculation result DB becomes zero.

Since the linear-addition correlation-calculation result DA and the linear-addition correlation-calculation result DB show the characteristics shown in FIG. 10A and FIG. 10B with respect to the phase shift "h," which is the phase difference of the bit transition position of the navigation data with respect to the top position of a unit period, the sum D of the absolute values of both the linear-addition correlation-calculation result DA and the linear-addition correlation-calculation result DB becomes constant. In other words, in this case, the following expression is satisfied.

$$D=|DA|+|DB|=20|d|$$

In other words, the sum D of the absolute values of both the linear-addition correlation-calculation result DA and the linear-addition correlation-calculation result DB is constant, 20M|d|, irrespective of the phase shift "h" between the bit transition positions of the received signal r(n) and the unit period. Therefore, the result MD of accumulation, output from the accumulative addition section 25 is a value obtained by simply accumulatively adding the constant for the M zones, that is:

$$MD=|DA|+|DB|=20M|d|$$

As described above, according to the fourth embodiment, even when the bit transition position is disposed anywhere with respect to the top position of a unit period, since the sum of the absolute values becomes a multiple of the correlation value "d," it becomes easier to specify the threshold in the correlation-point detection section 26, used for determining whether correlation exists. In addition, since DA and DB are the results of linear additions of correlation values each obtained in one period of the spreading code, in a unit period, the correlation values are added while noise is removed. It is expected that the detection sensitivity of a correlation point is improved.

In the fourth embodiment, as the digital matched filters 21 and 31, a transversal filter like that shown in FIG. 4 or a structure using an FFT process like that shown in FIG. 5 can be used in the same way as in the above-described first to third embodiments.

In the above description of the fourth embodiment, the unit period is set equal to the bit transition period. In the fourth embodiment, the unit period needs to be the bit transition period or shorter.

Fifth Embodiment

A fifth embodiment is a modification of the fourth embodiment and has the same relationship with the fourth embodiment as that of the second embodiment with the first embodiment. The fifth embodiment differs from the fourth embodiment in the procedure to obtain the result of correlation-value linear additions.

More specifically, in the above-described fourth embodiment, correlation calculations are performed every period of the spreading code for the first signal series A and the second signal series B by the digital matched filters 21 and 31, and the results of correlation calculations are linearly added every unit period. In the fifth embodiment, a first signal series A and a second signal series B are respectively linearly added in one period of the spreading code before the digital matched filters 21 and 31 perform correlation calculations, and the digital matched filters 21 and 31 apply correlation calculations to the results of linear additions.

Figure 11:
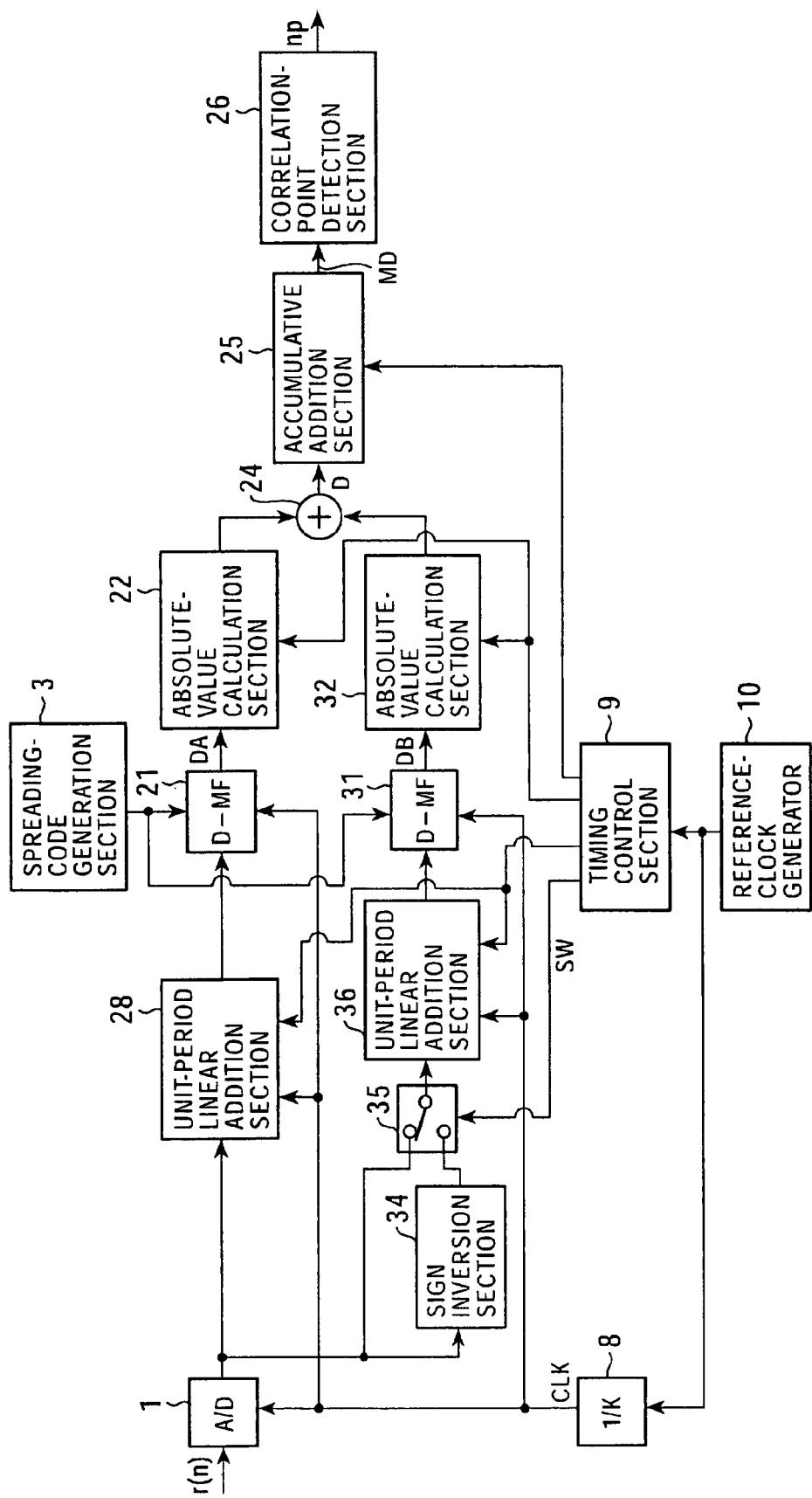
FIG. 11 is a block diagram of a spreading-code synchronization detection apparatus for a spectrum spreading signal according to a fifth embodiment of the present invention.

FIG. 11 is a block diagram showing an example structure of a spreading-code synchronization detection apparatus according to the fifth embodiment.

In the fifth embodiment, the first series A digital signal output from an A/D converter 1 is sent to a unit-period linear addition section 27. The unit-period linear addition section 27 applies linear additions in one period of the spreading code to a digital signal obtained in a unit period, actually in this case, a digital signal obtained in 20 periods (20 milliseconds) of the spreading code. In other words, 20 data items at the same chip phase of the spreading code are synchronously added in the digital signal in 20 periods of the spreading code within each unit period.

The second series B digital signal output from a switch circuit 35 is sent to a unit-period linear addition section 36. Like the unit-period linear addition section 27, the unit-period linear addition section 36 applies linear additions in one period of the spreading code to a digital signal obtained in a unit period, actually in this case, a digital signal obtained in 20 periods (20 milliseconds) of the spreading code. In other words, 20 data items at the same chip phase of the spreading code are synchronously added in the digital signal in 20 periods of the spreading code within each unit period.

Then, the results of synchronous additions (the same number of data items as the number of chips in one period of the spreading code) are sent to the digital matched filters 21 and 31, and correlation calculations are applied to the results of synchronous additions and the spreading code sent from a spreading-code generation section 3. The results of correlation calculations are sent to an absolute-value calculation sections 23 and 33. The other structure is the same as that of the fourth embodiment.

The fifth embodiment differs from the fourth embodiment in that linear additions are performed in one period of the spreading code in a stage prior to the digital matched filters 21 and 31, but obtains exactly the same result and advantage as the fourth embodiment.

Also in the fifth embodiment, the unit period is not limited to a case in which the unit period is set equal to the bit transition period. The unit period needs to be set equal to the bit transition period or shorter.

Sixth Embodiment

A sixth embodiment is a modification of the fourth embodiment and has the same relationship with the fourth embodiment as that of the third embodiment with the first embodiment. The sixth embodiment differs from the fourth embodiment in the procedure to obtain the result of correlation-value linear additions.

In the sixth embodiment, in a case in which a digital matched filter using FFT like that shown in FIG. 5 is used as digital matched filter 21 and 31, the unit-period linear addition sections 22 and 32 disposed subsequent to the digital matched filters 21 and 31 in the fourth embodiment, or the unit-period linear addition sections 27 and 36 disposed before the digital matched filters 21 and 31 in the fifth embodiment are omitted.

Figure 12:
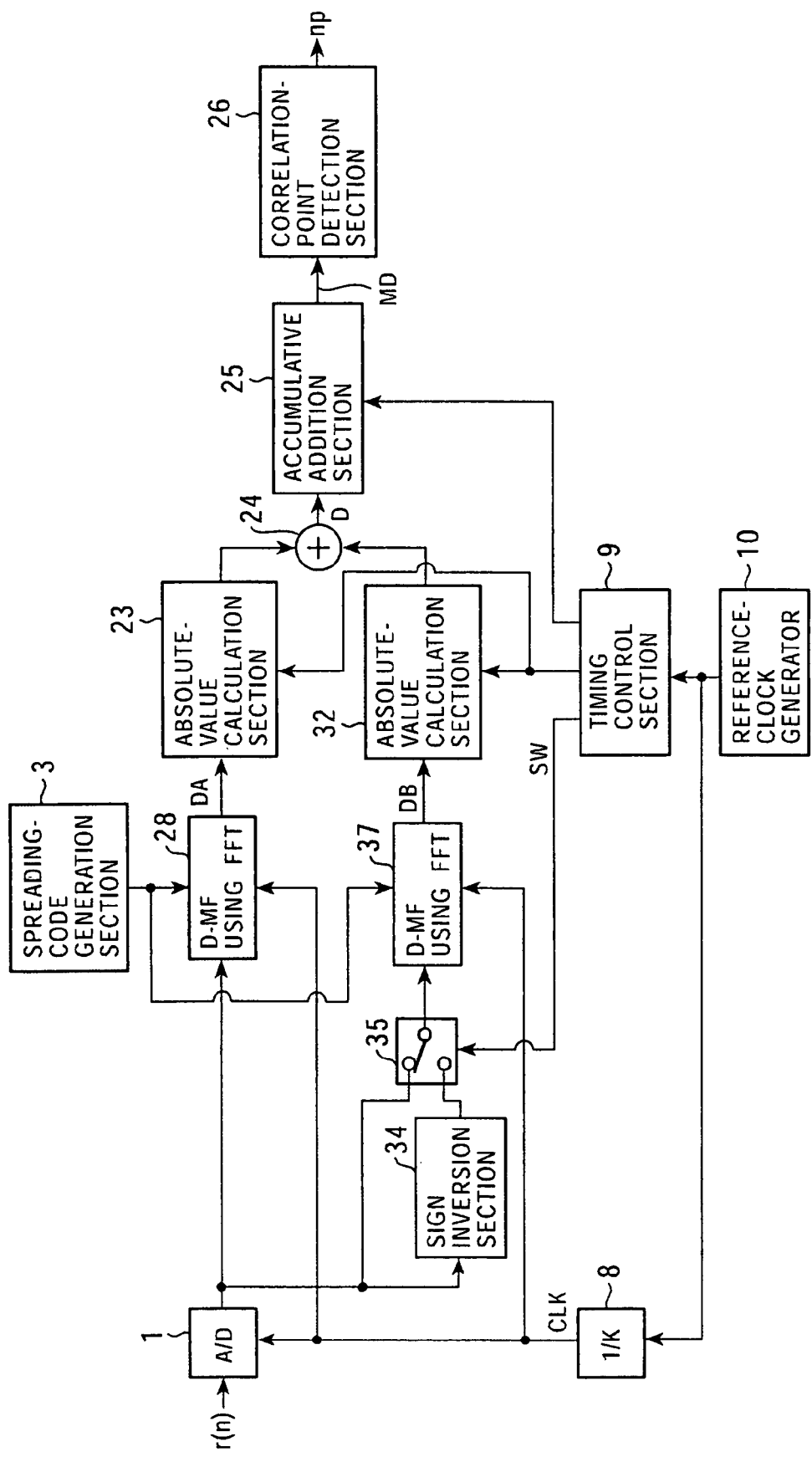
FIG. 12 is a block diagram of a spreading-code synchronization detection apparatus for a spectrum spreading signal according to a sixth embodiment of the present invention.

FIG. 12 is a block diagram showing an example structure of a spreading-code synchronization detection apparatus according to the sixth embodiment.

More specifically, in the sixth embodiment, a first signal series A digital signal is sent to a digital matched filter 28 using FFT, formed of a portion enclosed by a dotted line in FIG. 5, and written into its memory 211. In the same way, a second signal series B digital signal is sent to a digital matched filter 37 using FFT, and written into its memory 211.

In the sixth embodiment, digital data is read from the memory 211 in a unit period, and the digital data read in the unit period is sent to an FFT processing section 212, and FFT calculations are performed in each of the digital matched filters 28 and 37 using FFT.

In the sixth embodiment, the FFT processing sections 212 of the digital matched filters 28 and 37 apply FFT calculations to digital signals obtained for a unit period in the signal series A and the signal series B, respectively. Since the unit period includes the signal series A and the signal series B corresponding to 20 periods of the spreading code in the above-described case, each FFT processing section 212 outputs the result of FFT calculations, which is the same as the result obtained by accumulating the result of FFT calculations of the digital signal obtained every period of the spreading code, for 10 periods, and the output result of FFT calculations is written into a memory 213.

The subsequent processes in the digital matched filters 28 and 36 using FFT are exactly the same as those described by referring to FIG. 5. An inverse FFT processing section 217 outputs the result of a correlation calculation, which is again expressed in the time domain. In the sixth embodiment, the results of correlation calculations output from the digital matched filters 28 and 36 using FFT are the linear-addition correlation-calculation results DA and DB, and are sent to absolute-value calculation sections 23 and 33. The other structure is the same as that in the fourth embodiment.

As described above, according to the sixth embodiment, since FFT calculations are applied to digital signals obtained in a unit period, the unit-period linear addition sections 22 and 32 disposed subsequent to the digital matched filters 21 and 31 in FIG. 8, or the unit-period linear addition sections 27 and 36 disposed before the digital matched filters 21 and 31 in FIG. 11 can be omitted, and the structure is simplified.

Also in the sixth embodiment, the unit period is not limited to a case in which the unit period is set equal to the bit transition period. Since half a unit period needs to be equal to the bit transition period or shorter, the unit period needs to be twice the bit transition period or shorter.

Seventh Embodiment

In the above-described fourth to sixth embodiments, a digital signal converted from the received signal r(n) is inserted in sign between the first half and the second half of a unit period to generate the second signal series B, and the linear-addition correlation-calculation result DB is obtained in a unit period. Instead of inverting in sign the digital signal converted from the received signal r(n) between the first half and the second half of a unit period, when the spreading code sent from the spreading-code generation section 3 is inverted in sign between the first half and the second half of a unit period and sent to a digital matched filter, the same result and advantage are obtained.

Figure 13:
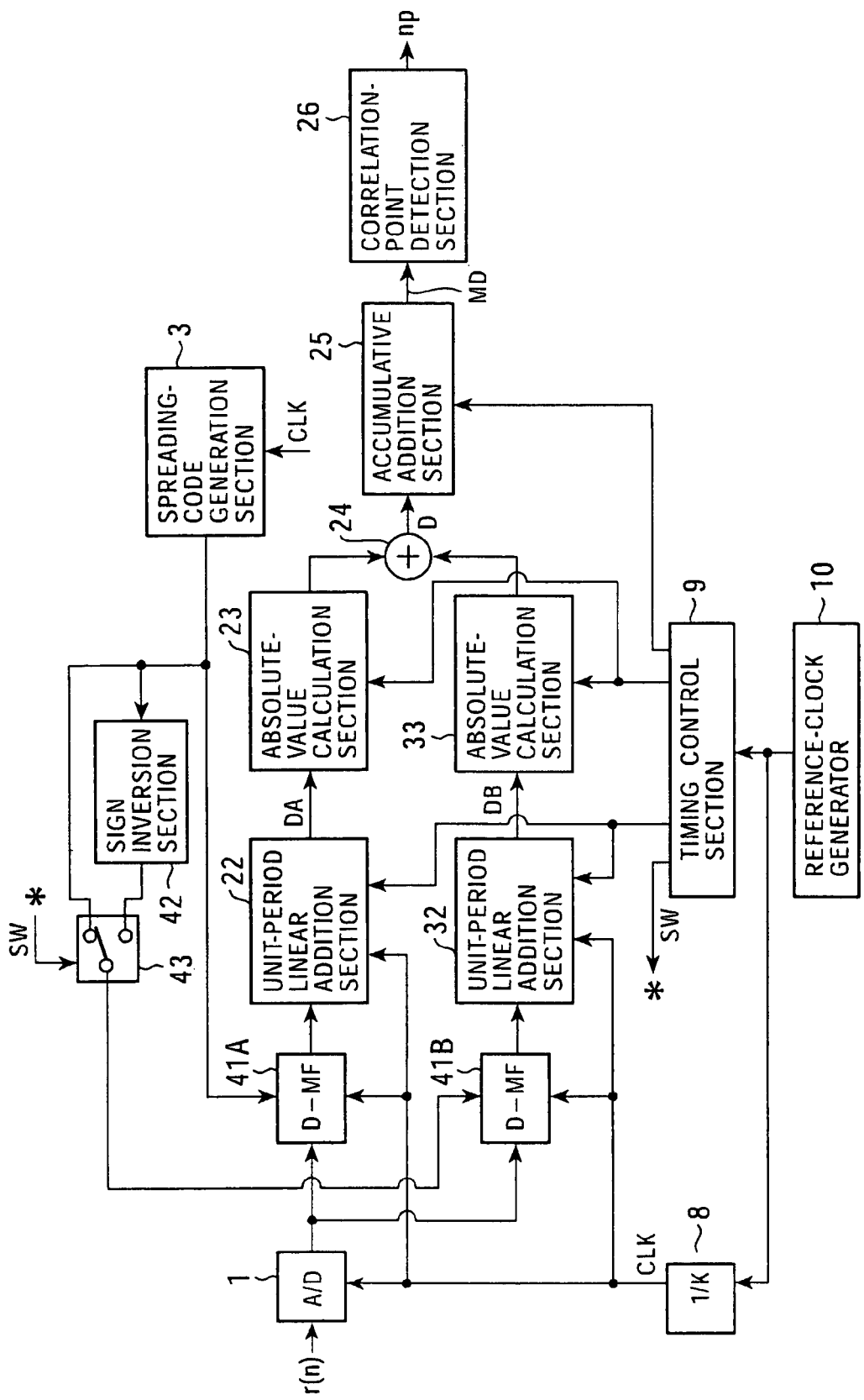
FIG. 13 is a block diagram of a spreading-code synchronization detection apparatus for a spectrum spreading signal according to a seventh embodiment of the present invention.

The seventh embodiment shows this case. FIG. 13 is a block diagram showing an example structure of a spreading-code synchronization detection apparatus according to the seventh embodiment.

More specifically, a digital signal output from an A/D converter 1 is sent to a digital matched filter 41A for a first signal series A. The digital matched filter 41A receives the spreading code as is from the spreading-code generation section 3. Therefore, the digital matched filter 41A outputs the same results of correlation calculations as the digital matched filter 21 for the first signal series A in the fourth embodiment, shown in FIG. 8.

The results of correlation calculations, each obtained in the period of the spreading code are sent from the digital matched filter 41A to a unit-period linear addition section 22, and linearly added for a unit period, in this case, for a one-bit period (20 milliseconds) of the navigation data in the same way as in the fourth embodiment. The linear-addition correlation-calculation result DA is sent from the unit-period linear addition section 22 to an absolute-value calculation section 23, converted to its absolute value, and sent to an addition section 24.

The digital signal output from the A/D converter 1 is also sent to a digital matched filter 41B for a second signal series B. The digital matched filter 41B receives the spreading code which is inverted in sign between the first half and the second half of a unit period, from a switch circuit 43.

More specifically, the spreading code sent from the spreading-code generation section 3 is input to one input end of the switch circuit 43 as is, and is also input to a sign inversion section 42, inverted in sign, and sent to the other input end of the switch circuit 43. The switch circuit 43 is alternately switched by a switching signal SW sent from a timing control section 9 between the one input end for the first half of a unit period and the other input end for the second half of the unit period.

As described above, since the spreading code sent to the digital matched filter 41B is inverted in sign between the first half and the second half of a unit period, the digital matched filter outputs exactly the same results of correlation calculations as the digital matched filter 31 for the second signal series B in the fourth embodiment, shown in FIG. 8.

The results of correlation calculations, each obtained in the period of the spreading code are sent from the digital matched filter 41A to the unit-period linear addition section 22, and linearly added for a unit period, in this case, for a one-bit period (20 milliseconds) of the navigation data in the same way as in the fourth embodiment. The linear-addition correlation-calculation result DA is sent from the unit-period linear addition section 22 to the absolute-value calculation section 23, converted to its absolute value, and sent to the addition section 24.

In the same way, the results of correlation calculations, each obtained in the period of the spreading code are sent from the digital matched filter 41B to a unit-period linear addition section 32, and linearly added for a unit period, in this case, for a one-bit period (20 milliseconds) of the navigation data in the same way as in the fourth embodiment. The linear-addition correlation-calculation result DB are sent from the unit-period linear addition section 32 to an absolute-value calculation section 33, converted to its absolute value, and sent to the addition section 24.

Therefore, the addition section 24 outputs the sum D of the absolute values, D=|DA|+|DB|. An accumulative addition section 25 calculates the result MD of accumulative additions thereof for M zones, and a correlation-point detection section 26 detects a correlation point for the result MD of accumulative additions. In other words, the same result and advantage as those in the fourth embodiment are obtained.

The method used in the seventh embodiment, in which the spreading code is inverted in sign between the first half and the second half of a unit period to obtain the results of correlation calculations of the second signal series B, can also be applied to the fifth embodiment.

More specifically, although not shown in a figure, one half-unit-period linear addition section is provided at the output side of the A/D converter 1 in FIG. 13. The half-unit-period linear addition section linearly adds data in the digital signal, corresponding to each chip in the spreading code for the first half and the second half of a unit period, that is, for half a unit period, in synchronization with the switching performed by the switch circuit 43 to linearly add the digital signal. The results of linear additions are sent to the digital matched filters 41A and 41B.

In this case, the digital matched filters 41A and 41B output the same results of correlation calculations as the linear-addition correlation-calculation results DA and DB, described above, and therefore, the unit-period linear addition sections 22 and 32 are unnecessary. The apparatus is structured such that the digital matched filters 41A and 41B output the results of correlation calculations to the absolute-value calculation sections 23 and 33 shown in FIG. 13.

The method used in the seventh embodiment, in which the spreading code is inverted in sign between the first half and the second half of a unit period to obtain the results of correlation calculations of the second signal series B, can further be applied to the sixth embodiment.

More specifically, although not shown in a figure also in this case, the digital matched filters 41A and 41B shown in FIG. 13 are formed of digital matched filters using FFT. The digital matched filters using FFT perform correlation calculations between the digital signal and the spreading code sent from the spreading-code generation section 3 or from the switch circuit 43 with the digital signal obtained in a unit period being used as an FFT calculation unit, as described by referring to FIG. 5 and FIG. 12.

According to this case, since FFT calculations are applied to the digital signal obtained in a unit period in the same way as in the case shown in FIG. 11, the unit-period linear addition sections disposed before or after the digital matched filters can be omitted, and the structure is simplified.

Also in the seventh embodiment, the unit period is not limited to a case in which the unit period is set equal to the bit transition period. Since half the unit period needs to be the bit transition period or shorter, the unit period needs to be twice the bit transition period or shorter.

Eighth Embodiment

An eighth embodiment shows another case in which the linear-addition correlation-calculation results DA and DB are obtained. In the fourth to seventh embodiments, digital matched filters for two paths are required. In the eighth embodiment, a structure which requires just one digital matched filter is proposed.

Figure 14:
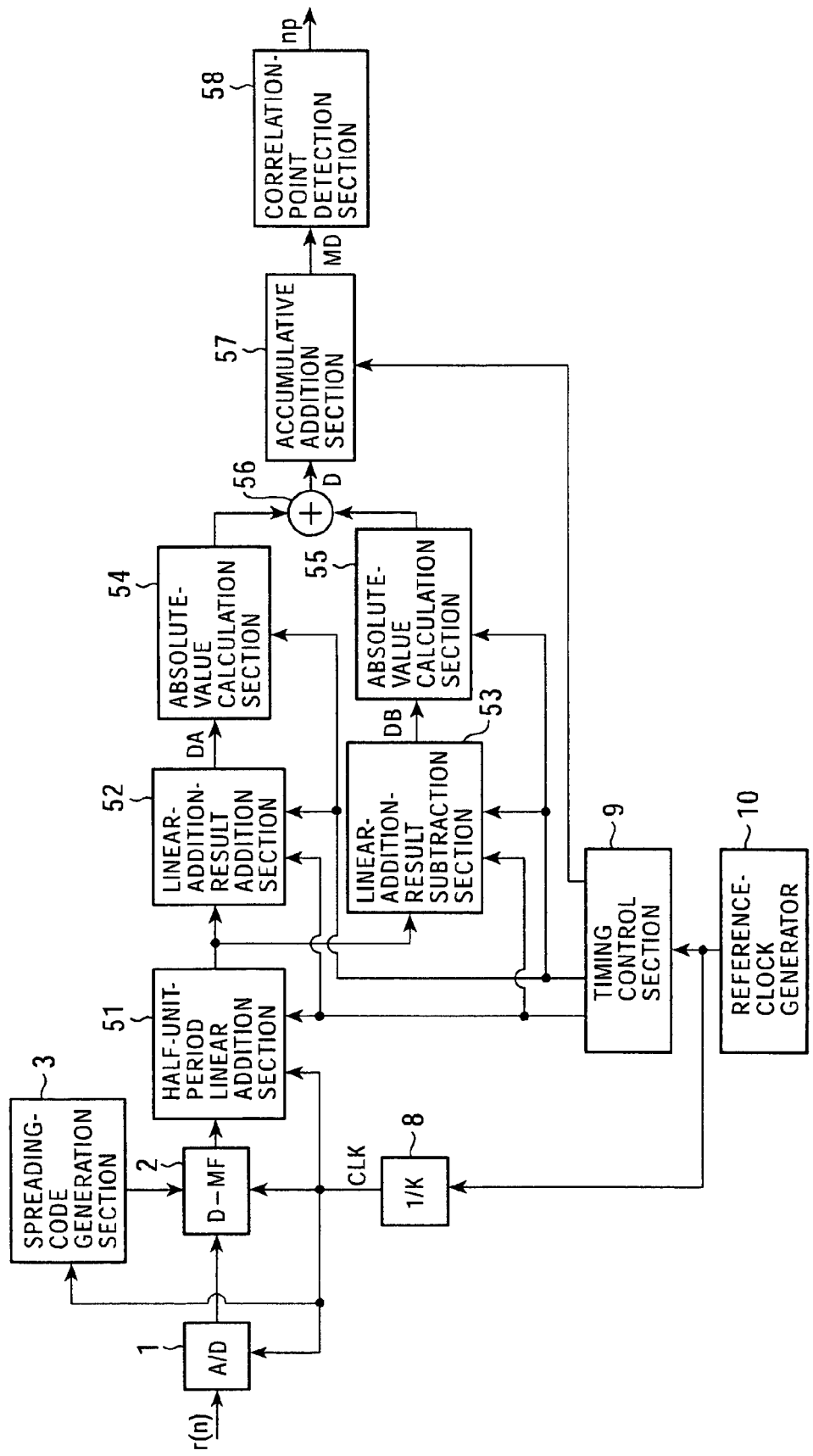
FIG. 14 is a block diagram of a spreading-code synchronization detection apparatus for a spectrum spreading signal according to an eighth embodiment of the present invention.
Figure 15:
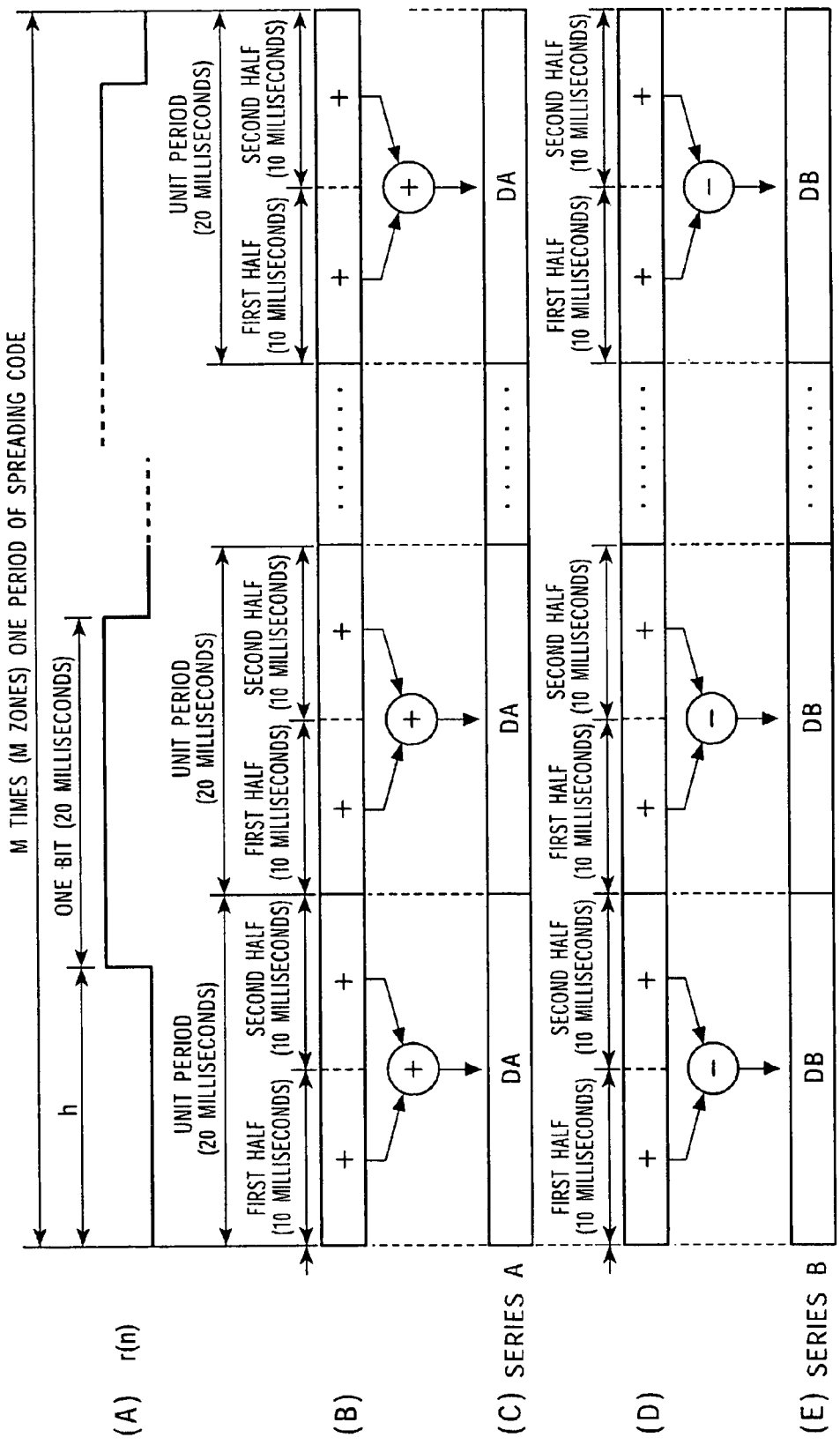
FIG. 15 is a view used for describing the operation of a main section in the eighth embodiment.

FIG. 14 is a block diagram of a spreading-code synchronization detection apparatus for a spectrum spreading signal according to the eighth embodiment. FIG. 15 is a timing chart used for describing operations according to the eighth embodiment.

In the eighth embodiment, a structure from the input of a received signal r(n) to a digital matched filter 2 is exactly the same as in the first embodiment. The digital matched filter 2 outputs the results of correlation calculations each obtained in one period of the spreading code, to a half-unit-period linear addition section 51. Also in the eighth embodiment, a unit period is set to the bit transition period of navigation data, which is 20 milliseconds, in the same way as in the fourth to seventh embodiments, described above.

The half-unit-period linear addition section 51 linearly adds the results of correlation calculations sent from the digital matched filter 2 for half the unit period, that is, for a first-half period and a second-half period of the unit period, and sends the result of linear additions to a linear-addition-result addition section 52 and to a linear-addition-result subtraction section 53.

The linear-addition-result addition section 52 adds the result of linear additions of the correlation values each obtained in one period of the spreading code, in the first half of a unit period to the result of linear additions of the correlation values each obtained in one period of the spreading code, in the second half of the unit period to generate the linear-addition correlation-calculation result DA for the first signal series A, described above, as shown in FIG. 15(B) and FIG. 15(C).

The linear-addition-result subtraction section 53 subtracts the result of linear additions of the correlation values each obtained in one period of the spreading code, in the second half of the unit period from the result of linear additions of the correlation values each obtained in one period of the spreading code, in the first half of the unit period to generate the linear-addition correlation-calculation result DB for the second signal series B, described above, as shown in FIG. 15(D) and FIG. 15(E).

The linear-addition correlation-calculation result DA output from the linear-addition-result addition section 52 is converted to its absolute value in an absolute-value calculation section 54, and then sent to an addition section 56. The linear-addition correlation-calculation result DB output from the linear-addition-result subtraction section 53 is converted to its absolute value in an absolute-value calculation section 55, and then sent to the addition section 56. Therefore, the sum D of the absolute values of the linear-addition correlation-calculation results DA and DB for the first and second series A and B is obtained from the addition section 56.

The sum D of the absolute values is sent from the addition section 56 to an accumulative addition section 57, and accumulatively added in M zones. The result MD of accumulative additions is sent to a correlation-point detection section 58. When a peak exceeding a threshold value specified in advance is detected, a correlation point np is detected.

According to the eighth embodiment, since the digital matched filter and the linear addition section for linearly adding the results of correlation calculations each obtained in one period of the spreading code can be shared for the first series A and the second series B, the structure of the apparatus is made simple.

Also in the eighth embodiment, the unit period is not limited to a case in which the unit period is set equal to the bit transition period. The unit period needs to be the bit transition period or shorter.

Ninth Embodiment

As described before, the linear-addition correlation-calculation results DA and DB for the first and second series A and B, obtained in the fourth to eighth embodiments have the characteristics shown in FIG. 10A and FIG. 10B, described before, with respect to the phase shift "h" between a unit period and bit transitions positions of navigation data, and the sum of the absolute values of the linear-addition correlation-calculation results DA and DB is constant, as described before.

However, the detection sensitivity of spreading-code synchronization is not constant in the viewpoint of C/N. When a bit transition position is located at the center of a first half or a second half of a unit period, since correlation values are offset by each other and become zero in the half of the unit period, where the bit transition is located, correlation values are substantially obtained only in the half of the unit period, where the bit transition is not located. Therefore, the C/N is reduced by 3 dB and the detection sensitivity is also reduced compared with a case in which the bit transition position matches the top position of the unit period.

To improve this problem, the phase shift "h" needs to be compensated for such that the bit transition position matches the top position of the unit period.

It is understood from the characteristic views of FIG. 10A and FIG. 10B that the ratio DA/DB between the linear-addition correlation-calculation results DA and DB has a unique value at each position of the phase shift "h." Therefore, the phase shift "h" of the bit transition position from the top position of the unit period can be estimated from the following expressions.

$$h = L/2 \times [1 + 1/\{(DB/DA) - 1\}] \qquad \text{[Expression (4-1)]}$$

when DA/DB≦0 (h≦L/2)

$$h = L/2 \times [1 + 1/\{(DB/DA) + 1\}] \qquad \text{[Expression (4-2)]}$$

when DA/DB>0 (h≧L/2)

Where L indicates the length of the unit period.

Figure 16:
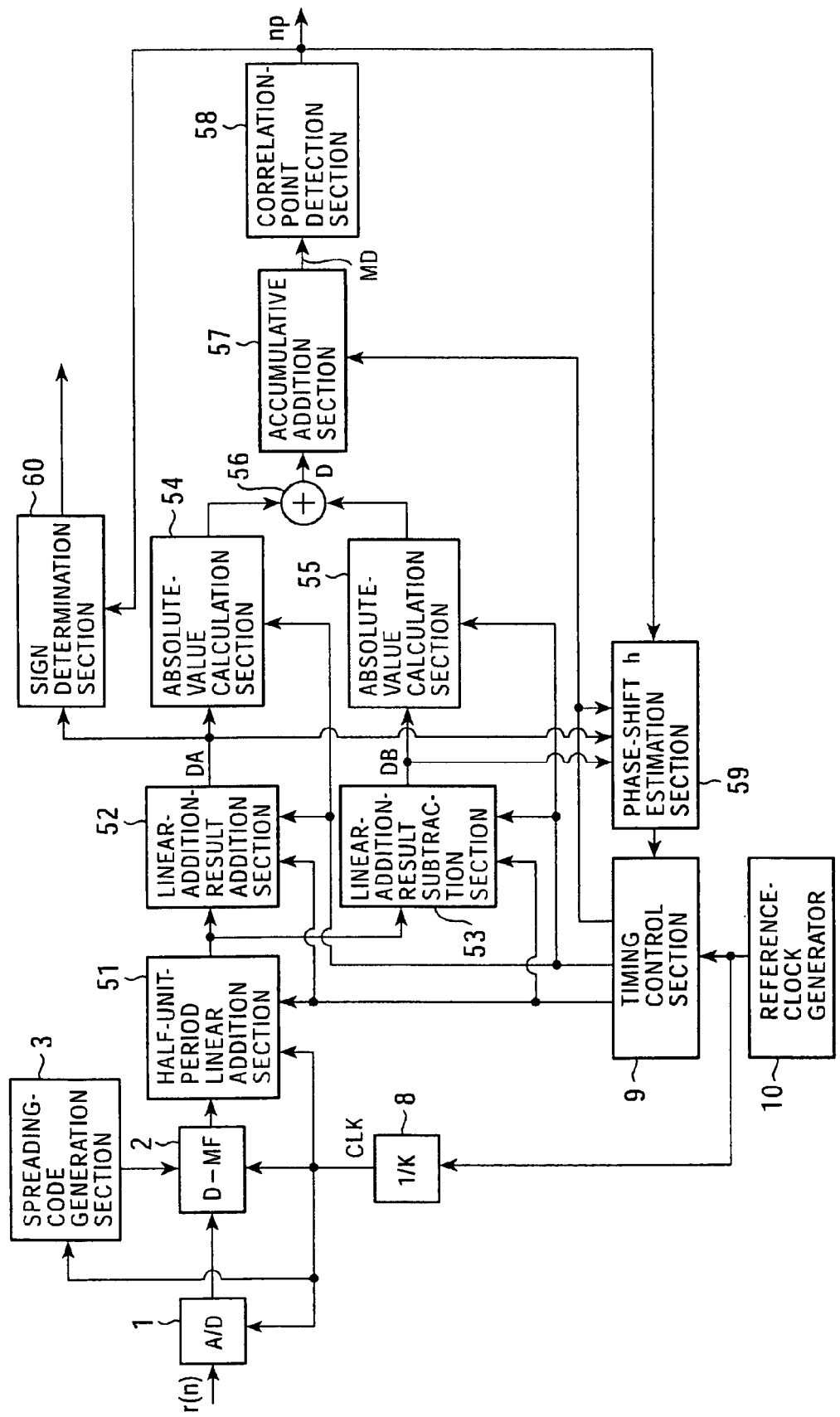
FIG. 16 is a block diagram of a spreading-code synchronization detection apparatus for a spectrum spreading signal according to a ninth embodiment of the present invention.

In the ninth embodiment, the top position of the unit period is synchronized with the bit transition position to improve the detection sensitivity with the use of the above-described point. FIG. 16 is a block diagram of a spreading-code synchronization detection apparatus for a spectrum spreading code according to the ninth embodiment. The above-described point is applied to the eighth embodiment, described before.

More specifically, in the ninth embodiment, the linear-addition correlation-calculation result DA output from a linear-addition-result addition section 52 and the linear-addition correlation-calculation result DB output from a linear-addition-result subtraction section 53 are sent to a phase-shift "h" estimation section 59. A timing control section 9 sends the same timing signal to the phase-shift "h" estimation section 59 as that sent to an accumulative addition section 57.

Figure 17:
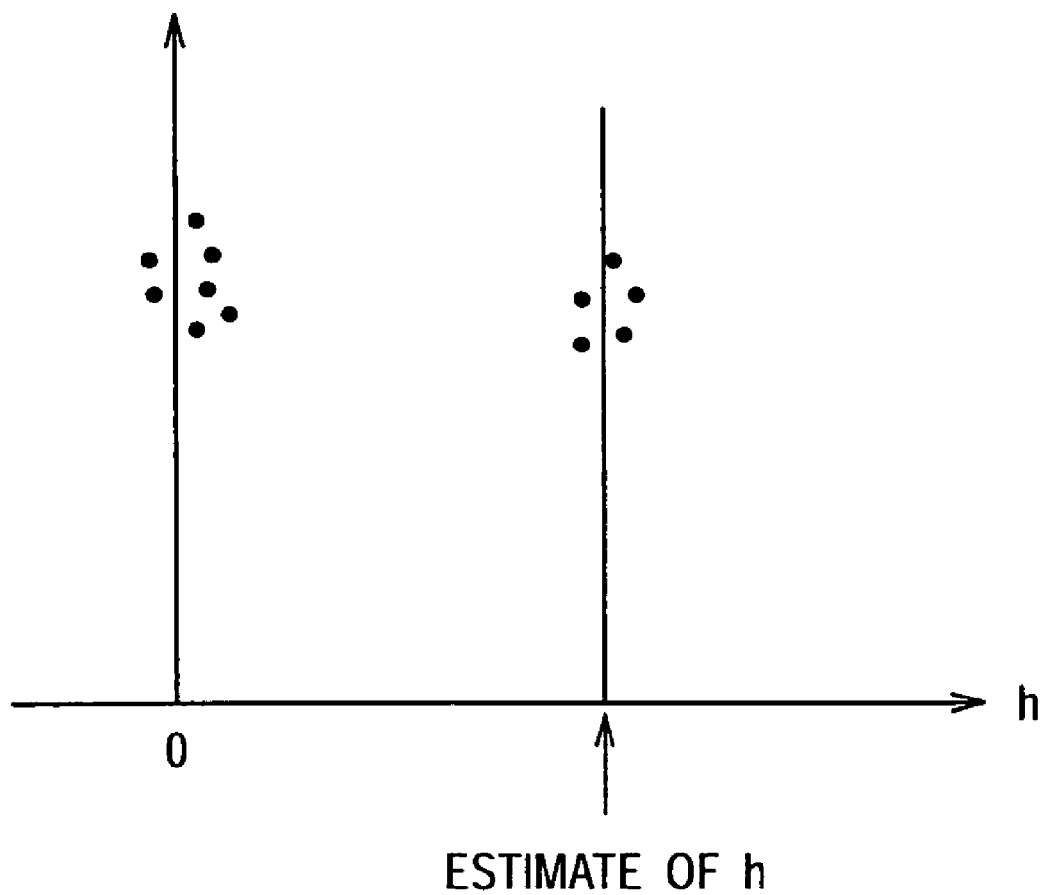
FIG. 17 is a view used for describing a main section in the ninth embodiment.

The phase-shift "h" estimation section 59 uses the above-described expressions (4-1) and (4-2) to estimate the phase shift "h" of a bit transition position from the top position of each unit period in each unit period of M zones. The M phase-shift "h" estimation values each estimated by the phase-shift "h" estimation section 59 for each unit period have two distributions, as shown in FIG. 17, one centered at h=0, which shows no phase shift "h," and the other centered at the phase shift "h" corresponding to the actual bit transition position shifted from the top position of a unit period.

The phase-shift "h" estimation section 59 determines groups related to the two phase-shift "h" distributions, estimates the phase shift "h" of the bit transition position from the top position of a unit period, and controls the timing control section 9 according to the result of estimation such that the timing at which the received signal r(n) is taken is shifted by the estimation value in the next and subsequent correlation detection so as to match the bit transition position with the top position of the above-described unit period used for correlation detection.

When the bit transition position is compensated as described above, the above-described unit period used for correlation detection is synchronized with the navigation data, and a reduction in C/N can be avoided thereafter.

When C/N is at a level sufficient for demodulating the navigation data, the bit transition position which has been compensated for the phase shift "h" matches the top position of the unit period, or slightly shifted therefrom. Therefore, DB is distributed at zero and in the vicinity thereof, and DA is distributed at +20|d| and in the vicinity thereof, or −20|d| and in the vicinity thereof depending on whether the navigation data bit is "0" or "1." Consequently, whether the navigation data bit is "0" or "1" can be determined by whether DA is +20|d| or −20|d|, that is, DA has a positive sign or a negative sign.

Figure 18:
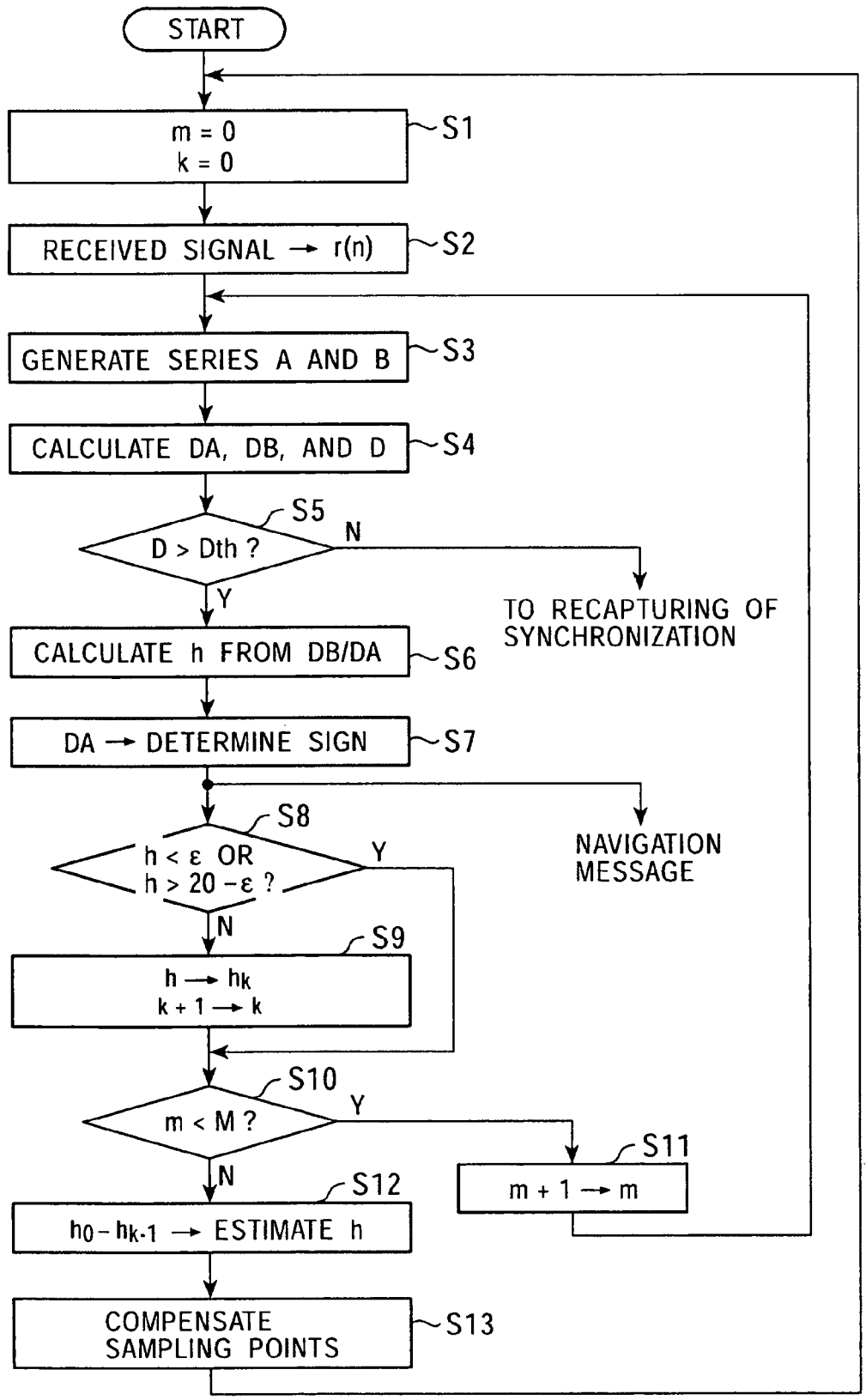
FIG. 18 is a flowchart used for describing a processing flow in the ninth embodiment.

FIG. 18 is a flowchart for describing the flow of the above-described process according to the ninth embodiment. In the process shown in the flowchart of FIG. 18, first and second signal series A and B are generated from a received signal, the linear-addition correlation-calculation results DA and DB are obtained, and the sum D of the absolute values thereof is further obtained as in the above-described fourth to sixth embodiments. In this case, it is assumed that the spreading signal is synchronized with the carrier.

This flowchart also shows a processing procedure for a case in which a spreading-code synchronization detection process is executed by software by using, for example, a DSP (digital signal processor) or a microcomputer.

First, a variable "m" which indicates that the processing is applied to the m-th unit period among M unit periods from the 0-th period to the (M−1)-th period in M zones is set to an initial value, zero, and a variable "k" which indicates the k-th phase shift "h" is set to an initial value, zero (in step S1).

Then, a received signal r(n) converted to a digital signal in an A/D converter 1 is used as an input signal, and it is read into a memory for M zones (in step S2). Next, a first signal series A and a second signal series B are generated from the digital signal obtained in a first unit period (m=0) (in step S3). Then, the linear-addition correlation-calculation results DA and DB are obtained for the series A and B, and further the sum D of the absolute values thereof is obtained, as described before (in step S4).

Then, it is determined whether the obtained sum D of the absolute values in the unit period is larger than a threshold Dth specified in advance (in step S5). When it is determined that the sum D of the absolute values is not larger than the threshold Dth, it is determined that carrier synchronization is not obtained, and the procedure proceeds to a routine for recapturing carrier synchronization.

When it is determined that the sum D of the absolute values is larger than the threshold Dth specified in advance, the ratio DB/DA between the correlation-value linear-addition correlation-calculation results DA and DB is obtained, and a phase shift "h" is calculated by the above-described expressions (4-1) and (4-2) (in step S6). Then, it is determined whether the sign of the linear-addition correlation-calculation result DA is positive or negative (in step S7). The result of determination is sent to a routine for determining and processing bit data of a navigation message.

Next, it is determined whether the phase shift "h" obtained in step S6 is in a vicinity of zero (in step S8). The method of determination is, as described in FIG. 18, whether one of the following expressions is satisfied.

$$h < \epsilon \qquad \text{[Expression (5)]}$$

$$h > 20 - \epsilon \qquad \text{[Expression (6)]}$$

Where, $\epsilon$ is a value which can be regarded as a vicinity of zero, such as 1.0 (millisecond), that is, is set to about one period of the spreading code. Since the unit period is 20 times the period of the spreading code, 20 milliseconds, "20−$\epsilon$" in expression (6) indicates that the phase shift is in a vicinity of one bit, that is, that the phase shift "h" between the unit period and the bit transition position is zero.

When it is determined in step S8 that the phase shift "h" is not in a vicinity of zero, it is determined that the top position of the unit period has the phase shift "h" with respect to the bit transition position, the phase shift "h" is stored in a memory as "$h_k$", and the variable "k" is incremented by one (in step S9). Then, the procedure proceeds to the next step S10, and it is determined whether the above-described processes have been performed for all unit periods in the M zones.

When it is determined in step S8 that the phase shift "h" is in a vicinity of zero, it is determined that the top position of the unit period is synchronized with the bit transition position, the procedure skips step 9 and jumps to step S10, and it is determined whether the above-described processes have been performed for all unit periods in the M zones.

When it is determined in step S10 that the above-described processes have not been performed for all unit periods in the M zones, the variable "m," which indicates the number of a unit period, is incremented by one (in step S11) to specify the next unit period, the procedure returns to step S3, and the processes of step S3 and subsequent steps are repeated.

When it is determined in step S10 that the above-described processes have been performed for all unit periods in the M zones, the phase shift "h" is estimated from the distribution state of k phase shifts h.sub.0 to h.sub.k−1, by using the relationship shown in FIG. 17 (in step S12).

Sampling points of the digital signal taken in the unit period are compensated by using the estimated phase shift "h" (in step S13), so that the top position of the unit period is synchronized with the bit transition position. Then, the procedure returns to step S1, and the above-described processes are repeated for the next M zones.

As described above, in the ninth embodiment, since the top position of a unit period is synchronized with a bit transition position of the navigation data, not only the detection sensitivity of the spreading-code synchronization is improved but also the demodulation of the navigation data is allowed by the sign, positive or negative, of the linear-addition correlation-calculation result DA.

In the example processing shown in the flowchart of FIG. 18, the received signal is stored for the M zones and then processed. The received signal is not necessarily stored, but may be processed in units of unit zones.

Also in the ninth embodiment, the same point as that for the above-described fourth to eighth embodiments is applied to the length of the unit period.

Tenth Embodiment

According to the method used in the above embodiment, the detection sensitivity (corresponding to the receiving sensitivity of a GPS receiver) of a spreading-code synchronization for a spectrum spreading signal is improved. The detection sensitivity and a processing time are trade-offs. When correlation is detected for many periods of the spreading code to improve the detection sensitivity, the processing time is inevitably extended.

In the above-described embodiment, it is assumed that carrier synchronization has been obtain beforehand. When a carrier frequency is unknown, a process for synchronizing the carrier is required, and an operation for searching for the carrier frequency is provided in some form. Since a correlation value is calculated for each frequency used in the searching, if the searching is performed many times, the GPS receiver may show a slow response.

Figure 19:
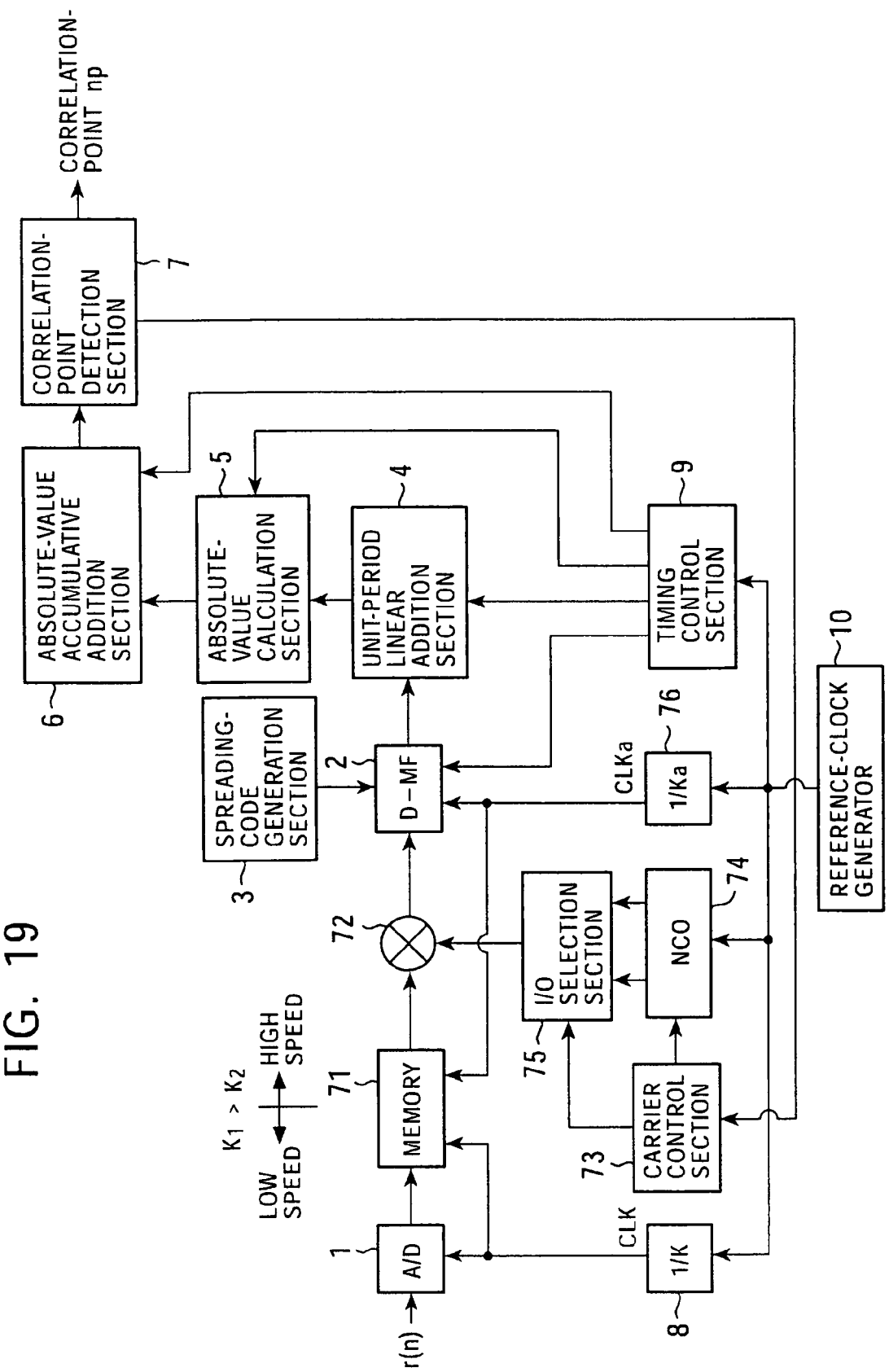
FIG. 19 is a block diagram of a spreading-code synchronization detection apparatus for a spectrum spreading signal according to a tenth embodiment of the present invention.
Figure 20:
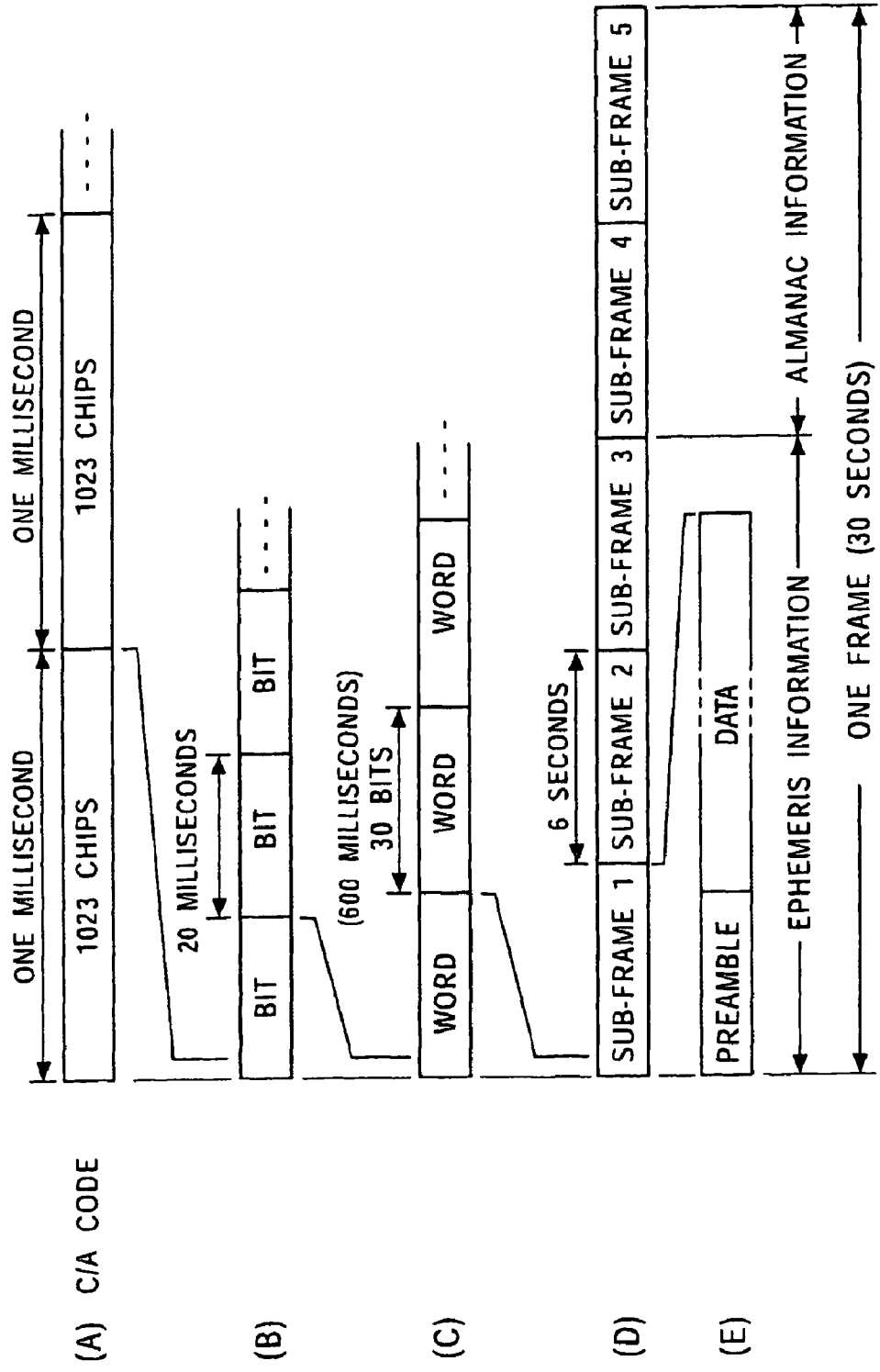
FIG. 20 is a view showing the structure of a signal sent from a GPS satellite.

A tenth embodiment satisfies the improvement of the detection sensitivity and high-speed processing at the same time. FIG. 19 is a block diagram of a spreading-code synchronization detection apparatus for a spectrum spreading signal according to the tenth embodiment. When the tenth embodiment is applied to the apparatus of the first embodiment, shown in FIG. 2, the case shown in FIG. 19 is obtained.

In the tenth embodiment, as shown in FIG. 19, a digital signal converted from a received signal r(n) and output from an A/D converter 1 is stored in a memory 71 in, for example, M zones. A clock signal CLK having the frequency corresponding to a chip rate of 1.023 MHz of a GPS signal and output from a scaler 8 is used as a writing clock signal, as in the above-described embodiments.

In the tenth embodiment, a higher-speed clock signal CLKa having a higher transfer speed than the chip rate of 1.023 MHz of the GPS signal is used for reading the signal from the memory 61 and for sending it to a subsequence digital matched filter 2. More specifically, a reference clock signal is output from a reference-clock generator 10 to a scaler 76, and the scaler 76 generates the higher-speed clock signal CLKa, and sends it to the memory 71 and to the digital matched filter 2.

Data read from the memory 71 is sent to a multiplier 72 for carrier synchronization. Clock signals I and Q having different phases are output from a clock generator 74 formed of a numerical-control variable-frequency oscillator (hereinafter called an NCO) to an I/Q selection section 75, alternately selected in a time-division manner therein, and sent to the multiplier 72. The clock generator 74 receives the reference clock signal from the reference-clock generator 10.

A carrier control section 73 is also provided. A control signal output from the carrier control section 73 controls the oscillating frequency of the NCO 74. The carrier control section 73 is controlled by a control signal corresponding to the result of correlation-point detection output from a correlation-point detection section 7, as described later.

While carrier synchronization is being obtained, the multiplier 72 outputs a digital signal from which the carrier component has been removed, to the digital matched filter 2. A structure from the digital matched filter 2 to the correlation-point detection section 7 is the same as that described by referring to FIG. 2.

In the tenth embodiment, the control signal corresponding to the result of correlation-point detection output from the correlation-point detection section 7 is sent to the carrier control section 73. In this case, the carrier control section 73 performs variable control according to the control signal sent from the correlation-point detection section 7 to increase or reduce the clock frequency of the NCO 74 until the correlation-point detection section 7 detects a correlation point by a peak exceeding a threshold, and maintains the frequency of the output clock signal of the NCO 74 when the correlation-point detection section 7 detects a correlation point np.

As described above, in the tenth embodiment, since the memory 71 is provided between the A/D converter 1 and the digital matched filter 2, and data read from the memory 71 is processed at a high speed by the higher-speed clock signal CLKa, the processing time required for the correlation-calculation process performed in the digital matched filter 2 and the linear-addition process can be reduced. When the transfer rate is made ten times higher assuming that the digital matched filter 2 has a margin in its hardware capability, for example, the processing time is reduced to one tenth. In searching for the carrier signal, it is not necessary to update the received signal every time the setting of a carrier frequency is changed, but the same data stored in the memory can be used.

In the above description, the tenth embodiment is applied to the first embodiment. The tenth embodiment can also be applied to the second to ninth embodiments.

Other Embodiments

In the above descriptions of the embodiments, the digital matched filter, the linear addition section, the absolute-value calculation section, the accumulative addition section, and the correlation-point detection section are structured as separate pieces of hardware. All of these sections may be structured by one DSP. A part of each section can also be structured by a DSP. The whole or part of each section can be structured by software processing.

In the above descriptions of the embodiments, the present invention is applied to a case in which a signal is received from a GPS satellite. The present invention is not limited to this case. It can also be applied to all cases in which spreading-code synchronization capturing is applied to a signal obtained by spectrum spreading data with a spreading code.

As described above, according to the present invention, the detection sensitivity of spreading-code synchronization for a spectrum spreading signal is greatly improved. Therefore, when the present invention is applied to a GPS receiver, for example, the receiving sensitivity is improved, and advantages, such as antenna compactness and the expansion of a receiving area, are expected.

Further, whereas a sliding correlator, which is used in a conventional method, requires time, in principle, to acquire synchronization, the present invention greatly reduces the processing time with an effective use of a high-speed DSP which employs a digital matched filter.

The invention claimed is:

1. A spreading-code synchronization detection method for a spectrum spreading signal obtained by spectrum-spreading data having a bit transition period that is a multiple of one period of a spreading code with the spreading code, comprising:

a unit-period correlation-calculation linear-addition step of performing a process for obtaining a linear-addition correlation-calculation result equal to a value obtained by linear additions of results of correlation calculations between the spectrum spreading signal and the spreading code, every unit period which is a multiple of one period of the spreading code and shorter than the bit transition period;

an absolute-value calculation step of calculating the absolute value of the linear-addition correlation-calculation result obtained every unit period in the unit-period correlation-calculation linear-addition step;

an absolute-value addition step of adding the absolute value of the linear-addition correlation-calculation result obtained every unit period, obtained in the absolute-value calculation step, for a plurality of unit periods; and a correlation-point detection step of detecting a correlation point from a value obtained by adding the absolute values in the absolute-value addition step;

wherein the spectrum spreading signal to which the spreading-code synchronization detection is applied is stored in a memory for the plurality of unit periods for which additions are performed in the absolute-value addition step, and the spectrum spreading signal is read from the memory at a higher speed than a speed used in writing into the memory and the unit period correlation-calculation linear-addition step and the subsequent steps are performed to increase the speed of the process for detecting a correlation point faster, characterized by using a digital matched filter to perform the correlation calculations between the spectrum spreading signal and the spreading code.

2. A spreading-code synchronization detection method for a spectrum spreading signal obtained by spectrum-spreading data having a bit transition period that is a multiple of one period of a spreading code with the spreading code, comprising:

a unit-period correlation-calculation linear-addition step of performing a process for obtaining a linear-addition correlation-calculation result equal to a value obtained by linear additions of results of correlation calculations between the spectrum spreading signal and the spreading code, every unit period which is a multiple of one period of the spreading code and shorter than the bit transition period;

an absolute-value calculation step of calculating the absolute value of the linear-addition correlation-calculation result obtained every unit period in the unit-period correlation-calculation linear-addition step;

an absolute-value addition step of adding the absolute value of the linear-addition correlation-calculation result obtained every unit period, obtained in the absolute-value calculation step, for a plurality of unit periods; and a correlation-point detection step of detecting a correlation point from a value obtained by adding the absolute values in the absolute-value addition step;

wherein the spectrum spreading signal to which the spreading-code synchronization detection is applied is stored in a memory for the plurality of unit periods for which additions are performed in the absolute-value addition step, and the spectrum spreading signal is read from the memory at a higher speed than a speed used in writing into the memory and the unit period correlation-calculation linear-addition step and the subsequent steps are performed to increase the speed of the process for detecting a correlation point faster, characterized by, in the unit-period correlation-calculation linear-addition step, linearly adding the results of correlation calculations between the spectrum spreading signal and the spreading code in the unit period.

3. A spreading-code synchronization detection method for a spectrum spreading signal obtained by spectrum-spreading data having a bit transition period that is a multiple of one period of a spreading code with the spreading code, comprising:

a unit-period correlation-calculation linear-addition step of performing a process for obtaining a linear-addition correlation-calculation result equal to a value obtained by linear additions of results of correlation calculations between the spectrum spreading signal and the spreading code, every unit period which is a multiple of one period of the spreading code and shorter than the bit transition period;

an absolute-value calculation step of calculating the absolute value of the linear-addition correlation-calculation result obtained every unit period in the unit-period correlation-calculation linear-addition step;

an absolute-value addition step of adding the absolute value of the linear-addition correlation-calculation result obtained every unit period, obtained in the absolute-value calculation step, for a plurality of unit periods; and a correlation-point detection step of detecting a correlation point from a value obtained by adding the absolute values in the absolute-value addition step;

wherein the spectrum spreading signal to which the spreading-code synchronization detection is applied is stored in a memory for the plurality of unit periods for which additions are performed in the absolute-value addition step, and the spectrum spreading signal is read from the memory at a higher speed than a speed used in writing into the memory and the unit period correlation-calculation linear-addition step and the subsequent steps are performed to increase the speed of the process for detecting a correlation point faster, characterized by, in the unit-period correlation-calculation linear-addition step, in each unit period, synchronously adding the spectrum spreading signal at each chip phase of the spreading code in one period of the spreading code, so that the spectrum spreading signal is linearly added, and correlation calculations are performed between the signal of the result of linear additions in one period of the spreading code and the spreading code.

4. A spreading-code synchronization detection method for a spectrum spreading signal obtained by spectrum-spreading data having a bit transition period that is a multiple of one period of a spreading code with the spreading code, comprising:

a unit-period correlation-calculation linear-addition step of performing a process for obtaining a linear-addition correlation-calculation result equal to a value obtained by linear additions of results of correlation calculations between the spectrum spreading signal and the spreading code, every unit period which is a multiple of one period of the spreading code and shorter than the bit transition period;

an absolute-value calculation step of calculating the absolute value of the linear-addition correlation-calculation result obtained every unit period in the unit-period correlation-calculation linear-addition step;

an absolute-value addition step of adding the absolute value of the linear-addition correlation-calculation result obtained every unit period, obtained in the absolute-value calculation step, for a plurality of unit periods; and a correlation-point detection step of detecting a correlation point from a value obtained by adding the absolute values in the absolute-value addition step;

wherein the spectrum spreading signal to which the spreading-code synchronization detection is applied is stored in a memory for the plurality of unit periods for which additions are performed in the absolute-value addition step, and the spectrum spreading signal is read from the memory at a higher speed than a speed used in writing into the memory and the unit-period correlation-calculation linear-addition step and the subsequent steps are performed to increase the speed of the process for detecting a correlation point faster, characterized by, in the unit-period correlation-calculation linear-addition step, performing correlation calculations between data obtained by applying Fourier transform to the spectrum spreading signal in the unit period and data obtained by applying Fourier transform to the spreading code.

5. A spreading-code synchronization detection apparatus for a spectrum spreading signal obtained by spectrum-spreading data, having a bit transition period that is a multiple of one period of a spreading code, with the spreading code, comprising:

unit-period correlation-calculation linear-addition means for performing a process for obtaining a linear-addition correlation-calculation result equal to a value obtained by linear additions of results of correlation calculations between the spectrum spreading signal and the spreading code, every unit period which is a multiple of one period of the spreading code and shorter than the bit transition period;

absolute-value calculation means for calculating the absolute value of the linear-addition correlation-calculation result obtained every unit period by the unit-period correlation-calculation linear-addition means;

absolute-value addition means for adding the absolute value of the linear-addition correlation-calculation result obtained every unit period, obtained by the absolute-value calculation means, for a plurality of unit periods; and correlation-point detection means for detecting a correlation point from a value obtained by adding the absolute values in the absolute-value addition means;

wherein a memory is provided for storing the spectrum spreading signal to which the spreading-code synchronization detection is applied, for the plurality of unit periods for which additions are performed by the absolute-value addition means, and the spectrum spreading signal is read from the memory at a higher speed than a seed used in storing the spectrum spread signal in the memory and the correlation calculations are performed to increase a speed of the process for detecting a correlation point, characterized in that a digital matched filter is used to perform the correlation calculations between the spectrum spreading signal and the spreading code.

6. A spreading-code synchronization detection apparatus for a spectrum spreading signal obtained by spectrum-spreading data, having a bit transition period that is a multiple of one period of a spreading code, with the spreading code, comprising:

unit-period correlation-calculation linear-addition means for performing a process for obtaining a linear-addition correlation-calculation result equal to a value obtained by linear additions of results of correlation calculations between the spectrum spreading signal and the spreading code, every unit period which is a multiple of one period of the spreading code and shorter than the bit transition period;

absolute-value calculation means for calculating the absolute value of the linear-addition correlation-calculation result obtained every unit period by the unit-period correlation-calculation linear-addition means;

absolute-value addition means for adding the absolute value of the linear-addition correlation-calculation result obtained every unit period, obtained by the absolute-value calculation means, for a plurality of unit periods; and correlation-point detection means for detecting a correlation point from a value obtained by adding the absolute values in the absolute-value addition means;

wherein a memory is provided for storing the spectrum spreading signal to which the spreading-code synchronization detection is applied, for the plurality of unit periods for which additions are performed by the absolute-value addition means, and the spectrum spreading signal is read from the memory at a higher speed than a speed used in storing the spectrum spread signal in the memory and the correlation calculations are performed to increase a speed of the process for detecting a correlation point, characterized in that the unit-period correlation-calculation linear-addition means comprises means for linearly adding the results of correlation calculations between the spectrum spreading signal and the spreading code in the unit period.

7. A spreading-code synchronization detection apparatus for a spectrum spreading signal obtained by spectrum-spreading data, having a bit transition period that is a multiple of one period of a spreading code, with the spreading code, comprising:

unit-period correlation-calculation linear-addition means for performing a process for obtaining a linear-addition correlation-calculation result equal to a value obtained by linear additions of results of correlation calculations between the spectrum spreading signal and the spreading code, every unit period which is a multiple of one period of the spreading code and shorter than the bit transition period;

absolute-value calculation means for calculating the absolute value of the linear-addition correlation-calculation result obtained every unit period by the unit-period correlation-calculation linear-addition means;

absolute-value addition means for adding the absolute value of the linear-addition correlation-calculation result obtained every unit period, obtained by the absolute-value calculation means, for a plurality of unit periods; and correlation-point detection means for detecting a correlation point from a value obtained by adding the absolute values in the absolute-value addition means;

wherein a memory is provided for storing the spectrum spreading signal to which the spreading-code synchronization detection is applied, for the plurality of unit periods for which additions are performed by the absolute-value addition means, and the spectrum spreading signal is read from the memory at a higher speed than a speed used in storing the spectrum spread signal in the memory and the correlation calculations are performed to increase a seed of the process for detecting a correlation point, characterized in that the unit-period correlation-calculation linear-addition means comprises means for synchronously adding, in each unit period, the spectrum spreading signal at each chip phase of the spreading code in one period of the spreading code to linearly add the spectrum spreading signal, and for performing correlation calculations between the signal of the result of linear additions in one period of the spreading code and the spreading code.

8. A spreading-code synchronization detection apparatus for a spectrum spreading signal obtained by spectrum-spreading data, having a bit transition period that is a multiple of one period of a spreading code, with the spreading code, comprising:

unit-period correlation-calculation linear-addition means for performing a process for obtaining a linear-addition correlation-calculation result equal to a value obtained by linear additions of results of correlation calculations between the spectrum spreading signal and the spreading code, every unit period which is a multiple of one period of the spreading code and shorter than the bit transition period;

absolute-value calculation means for calculating the absolute value of the linear-addition correlation-calculation result obtained every unit period by the unit-period correlation-calculation linear-addition means;

absolute-value addition means for adding the absolute value of the linear-addition correlation-calculation result obtained every unit period, obtained by the absolute-value calculation means, for a plurality of unit periods; and correlation-point detection means for detecting a correlation point from a value obtained by adding the absolute values in the absolute-value addition means;

wherein a memory is provided for storing the spectrum spreading signal to which the spreading-code synchronization detection is applied, for the plurality of unit periods for which additions are performed by the absolute-value addition means, and the spectrum spreading signal is read from the memory at a higher speed than a speed used in storing the spectrum spread signal in the memory and the correlation calculations are performed to increase a speed of the process for detecting a correlation point, characterized in that the unit-period correlation-calculation linear-addition means comprises means for performing correlation calculations between data obtained by applying Fourier transform to the spectrum spreading signal in the unit period and data obtained by applying Fourier transform to the spreading code.

* * * * *